(12) United States Patent
Schoenberger et al.

(10) Patent No.: US 7,218,210 B2
(45) Date of Patent: May 15, 2007

(54) PRESSURE SENSING METHOD AND APPARATUS

(76) Inventors: Bruce Schoenberger, 1399 Nectarine Rd., Danielsville, PA (US) 18038; Edward P. Eberhardt, 4132 Mountain Rd., Slatingdon, PA (US) 18080

( * ) Notice: Subject to any disclaimer, the term of this patent is extended or adjusted under 35 U.S.C. 154(b) by 54 days.

(21) Appl. No.: 10/799,932

(22) Filed: Mar. 12, 2004

(65) Prior Publication Data
US 2005/0199328 A1    Sep. 15, 2005

(51) Int. Cl.
*B60C 23/00*    (2006.01)
(52) U.S. Cl. .................. 340/445; 340/442; 340/539.16; 73/146; 116/34 R; 116/34 A; 116/34 B
(58) Field of Classification Search ................ 340/442, 340/445, 447, 539.16, 539.17; 73/146; 116/34 R, 116/34 A, 34 B
See application file for complete search history.

(56) References Cited

U.S. PATENT DOCUMENTS

| | | | | |
|---|---|---|---|---|
| 5,048,116 A | * | 9/1991 | Schaeffer | ..................... 455/561 |
| 5,100,206 A | * | 3/1992 | Feng | ...................... 301/37.108 |
| 6,011,463 A | * | 1/2000 | Cormier, Sr. | ............... 340/447 |
| 6,535,803 B1 | * | 3/2003 | Fennel | ......................... 701/33 |
| 6,738,697 B2 | * | 5/2004 | Breed | ............................ 701/29 |
| 2002/0050164 A1 | | 5/2002 | Wallach | ...................... 73/146.3 |
| 2002/0059075 A1 | * | 5/2002 | Schick et al. | ................... 705/1 |
| 2002/0070881 A1 | * | 6/2002 | Marcarelli et al. | ........... 340/988 |
| 2002/0075145 A1 | * | 6/2002 | Hardman et al. | ........... 340/442 |
| 2003/0047988 A1 | | 3/2003 | Wallach | .................. 301/37.102 |
| 2003/0051545 A1 | | 3/2003 | Wallach | ........................ 73/146 |

* cited by examiner

*Primary Examiner*—Jeffery Hofsass
*Assistant Examiner*—Samuel J Walk
(74) *Attorney, Agent, or Firm*—Charles N. Quinn

(57) ABSTRACT

A multi-wheel highway vehicle for transporting passengers, cargo or both has a plurality of wheels supporting the vehicle with the wheels having pneumatic tires mounted thereon, at least one transducer connected to one of the wheels for sensing pressure in a tire mounted on the wheel and providing a output signal indicative of the pressure, a comparator mounted on the wheel receiving the output signal provided by the transducer for comparing the output signal from the transducer to a reference and providing a second output signal indicative of the comparison and a transmitter carried by the vehicle receiving the second output signal provided by the comparator for sending tire pressure information derived from the second output signal to a remote locale, optionally together with information identifying the vehicle and/or the location of the vehicle and/or the speed and/or the direction of travel of the vehicle and/or the identity of the driver of the vehicle.

3 Claims, 13 Drawing Sheets

PRESSURE SENSING METHOD AND APPARATUS

BACKGROUND OF THE INVENTION

1. Field of Invention

The invention relates to pressure indicating methods and apparatus in general, and more particularly to tire pressure indicators and easy access tire fill valves for single and dual wheel tire assemblies and methods for monitoring vehicle tire pressure. Other aspects of the invention relate to a wheel clip assembly that secures a wheel cover to a wheel rim. Aspects of the invention also relate to an aerodynamic wheel cover that reduces drag and lowers the operating temperature of the wheel.

2. Description of the Related Art

Fuel and tires represent the greatest operating cost for a single tractor/trailer or an entire fleet. If a truck tire that normally operates at one hundred pounds per square inch is twenty-five to thirty percent underinflated, which causes excessive tread wear due to heat and friction and reduces fuel efficiency due to resistance and drag. At today's average cost of two hundred to three hundred dollars per tire, under inflation could account for as much as seventy-five dollars per tire in tire costs alone. Under inflation also negatively impacts the longevity of tire casings. Proper air pressure maintenance assures that tires can be recapped up to five times.

Prior art methods and devices for maintaining proper tire pressure include mechanical spring powered hand pressure gauges carried by the driver and used to periodically check tire pressure and to fill tires to proper levels. Tire gauges or indicators, which are permanently mounted to the tire fill-valve, provide a readout of the tire pressure when viewed by the truck operator.

Truck drivers most commonly use the manual pressure gauges to check tire inflation pressure, usually after first tapping the tire with their foot or a tool and finding that pressure is low. Such a check detects a low tire only after a significant loss of tire pressure. With a slow leak, a tire may have been operating at low pressure for some time and some tire degradation may already have occurred. Also, over pressure is not detectable by such tapping.

Low tire pressure increases the amount of tire tread contacting the highway. This can develop into a condition referred to as "over steer". This condition occurs when the low tire, if on the rear of a car, actually steers the car due to the increased tire footprint on the rear when the car is affected by side winds or is on a steeply crowned road surface. In such cases, the driver may lose directional control of the vehicle.

Excellent examples of the consequences of under inflation of tires are found along the shoulders of interstate highways, where black tire treads have separated from the tires due to low tire pressure of the inner tire on the dual wheels. Such tires have generated so much road friction, resulting in heat in the tire, that the tire tread comes off of the tire casing. Truck companies cannot afford to have employees check the eighteen tires on every trip and therefore truck drivers may check tires only once or twice a year on over-the-road trucks, which may be driven up to 125,000 miles per year.

Environmental and danger hazards of such tire treads and such practices are obvious. Hazardous material truckers are suppose to check the tires every one hundred miles driven or every two hours of driving. This very infrequently occurs.

Permanently mounted tire pressure gauges and pressure indicators may be on a tire valve stem adjacent the rim are small in size and require the operator to bend down to the tire before the operator can see the gauge pressure. Some gauges mounted away from the rim tire valve are actually covered with a cover and require an effort on the part of the operator to remove the cover before checking the gauge(s). No known permanently mounted tire pressure indication systems offer an easily seen gauge which can be easily viewed by the truck operator as the operator inspects the wheels of a stationary vehicle to see if inflation pressure is in the proper range.

One known specific example of a permanently mounted tire inflation indicator is found in U.S. Pat. No. 3,958,526. An under-inflation type warning system is disclosed. A collapsible bladder mounted axially on the wheel is connected to a tire and is inflated whenever tire pressure falls below a predetermined level. However, there is no warning provided by this system for a slowly leaking tire or for over-inflation. There is no easily visible gauge which shows pressure in the tire at all times and guides the operator in inflating the tire to the proper level. The system uses conventional rim-attached tire fill-valves.

Another example may be found in U.S. Pat. No. 4,387,931, where a pressurized container regulated to desired tire pressure is continuously connected to all of the tires to thus maintain them all at the proper pressure level. However, this system provides no actual gauge reading(s) of tire pressure, and a failure of the pressure regulator or the container could result in an undetected over-pressurized or under-pressurized condition in all of the tires.

A dual-tire, wheel assembly tire pressure indicating system is disclosed in U.S. Pat. No. 4,953,395. The gauge or gauges are located in the center hub of the wheel and are covered with a removable cover, requiring the operator to bend down to wheel level to uncover and view the gauges. Further, there is no indication that the gauges offer any area markings thereon to indicate proper or improper inflation, nor is these any analog pressure readout to aid in inflating the tire to the optimal pressure of one hundred pounds per square inch, nor is there any identification of which gauge is for the front and which is for the rear tire of a dual wheel assembly.

Another conventional dual-tire, wheel assembly tire pressure indicating system is disclosed in U.S. Pat. No. 5,770,797. The '797 tire pressure indicating system includes a pair of readout pressure gauges mounted on a full wheel streamlined hubcap. The hubcap is mounted to the outside wheel of a dual wheel assembly using a U-shaped bracket connected to the wheel through the wheel bolts with the hubcap connected thereto by quarter turn fastener assemblies.

There is a problem associated with such prior art devices in that if the device becomes detached from the tire fill-valve while the vehicle is in motion, the device may become a high velocity projectile and thus present a safety hazard. Another problem with such prior devices is that, because of the eccentricity of the load they add to the tire, the tire may become unbalanced, thus presenting a safety problem and causing an uneven and unsafe ride.

Another problem of such prior art devices is that they require use of a mounting device for the tire pressure gauges, such as a hubcap assembly mountable to the front wheel of a deep dish dual wheel assembly through a bracket assembly connected by wheel bolts or nuts to oppositely located studs of the outside wheel of a dual wheel assembly. Such a tire pressure indication system is disclosed in U.S. Pat. No. 5,770,797 herein incorporated by reference. This unnecessary practice of providing a tire pressure indication system mounted to a hubcap assembly increases the cost and weight associated with the tire pressure indication system.

Typical tire/wheel arrangements for heavy-duty roadway vehicles, such as tractors, trailers, and trucks, have to contend with situations relating to the optimal performance of the vehicle. A nut and bolt assembly, which typically extends from the wheel rim, may cause drag and effect optimal performance of the vehicle. Even further, during the travel or braking of the vehicle, the tire/wheel arrangement may experience a high operating temperature. The high operating temperature may have an undesirable effect on vehicle performance and/or result in pressure losses in the tire. Even further, in certain trucking applications, such as hauling of hazardous materials, the Department of Transportation (DOT) requires certain safety standards in monitoring tire pressure. The DOT requires that trucks stop every two hours or every one hundred miles in order to check air pressure in every tire. Because such trucks are frequently stopped so the tires may be checked for pressure losses, a vehicle operator periodically may have to pressurize the tires. There is a need for a new tire/wheel arrangement that permits and maintains optimal performance of the vehicle by reducing drag and lowering the operating temperature of the tire/wheel arrangement.

SUMMARY OF THE INVENTION

In one of its aspects, this invention provides apparatus for sensing when pressure in a vehicle tire or other pressure vessel(s) is outside pre-selected range and providing a signal indicative thereof at a remote locale, where the apparatus in this aspect preferably includes a transducer for detecting pressure in the tire or other pressure vessel and providing a first output signal indicative thereof. The apparatus preferably further includes means, most preferably a battery, for providing electrical energy to the transducer. The apparatus in this aspect of the invention further preferably includes a comparator, powered by the electrical energy providing means such as the preferred battery or other device, for comparing the signal from the transducer to a reference, which is preferably an electrical signal, and providing a second output signal indicative of the comparison. The apparatus in this aspect of the invention preferably further includes a relay receiving the second output signal as input thereto for actuation of the relay thereby. The apparatus preferably further includes a transmitter, powered by such actuation of the relay by the comparator, for providing a third signal to a remote receiver, with the third signal indicating pressure in the tire or other pressure vessel being at a pre-selected level relative to the reference.

In another of its aspects, this invention provides a method for sensing when pressure in a vehicle tire or other pressure vessel is outside a pre-selected range and providing a signal indicative thereof at a remote locale, where the method preferably includes detecting pressure in the tire or other pressure vessel and providing a signal which is indicative thereof, comparing the signal to a reference, providing an output signal when the indicated signal and the reference are in a pre-selected relationship denoting that pressure in the tire or other pressure vessel is outside of the pre-selected range and generating and transmitting to the remote locale an output signal denoting that the tire or other pressure vessel pressure is outside of the pre-selected range.

In still another one of its aspects this invention provides apparatus for sensing when pressure in a vehicle tire or other vessel(s) is below a pre-selected level and providing a signal indicative thereof at a remote locale. In this aspect of the invention, the apparatus preferably includes a transducer for detecting pressure in the tire and providing a first output signal which is indicative of that pressure. The apparatus preferably further includes a battery for providing electrical energy to the transducer, a comparator powered by the battery for comparing the first output signal from the transducer to a reference and providing a second output signal which is indicative of the comparison. In this aspect the apparatus of the invention preferably further includes a relay receiving the second output signal from the comparator as input to the relay with the relay being energized thereby. This aspect of the invention preferably further includes a transmitter, energized by actuation of the relay by the second output signal coming from the comparator, with the transmitter providing a third output signal to a remote receiver with the third output signal provided by the transmitter indicating pressure in the tire or other vessel being at a level less than the reference.

In this aspect of the invention, the transducer preferably is one which is continuously detects pressure in the tire or other pressure vessels.

The first output signal provided by the transducer is preferably is a first electrical output signal and most preferably an electrical voltage signal. The second output signal coming from the comparator is preferably electrical output signal and is most preferably an electrical voltage output signal.

In another one of its aspects this invention provides a method for continuously sensing when pressure in a tire or other vessel(s) is below a pre-selected level and providing a signal indicative thereof at a remote locale where the method preferably includes the steps of detecting pressure in the tire or other vessel and providing a first output signal which is indicative of the detected pressure, comparing the first output signal to a reference and providing a second output signal when the first output signal and the reference are in a pre-selected relationship indicative of pressure in the tire or other vessel(s) being below a pre-selected level and thereafter generating and transmitting a third output signal indicative of the pressure in the tire or other vessel(s) being below the pre-selected level responsively to the second output signal coming from the comparison function.

In this method aspect of the invention, pressure is preferably detected continuously.

In this method aspect of the invention, the first output signal provided upon detection of the tire pressure is preferably a first electrical output signal and is most preferably an electrical output voltage signal.

In yet still another of its aspects this invention provides apparatus for sensing when pressure in one or a plurality of pressure vessels has gone outside of pre-selected limits and providing a signal indicative thereof at a remote locale where the apparatus preferably includes means for detecting pressure in the vessel(s) and providing a first output signal which is indicative thereof, means for providing electrical energy to the pressure detecting means, electrically powered means for comparing the first output signal to a reference and providing a second output signal indicative of the comparison, and transmitting means receiving the second output signal for providing a third output signal to a remote receiver with the third output signal indicating pressure in the vessel(s) being outside the pre-selective limits defined by the reference.

In this apparatus aspect of the invention, the pressure detecting means preferably substantially continuously detects pressure in the vessel(s). In this apparatus aspect of the invention, the first transducer output signal is preferably a first electrical output signal and the second output signal is preferably electrical output signal.

In a further one of its aspects this invention provides a method for sensing when pressure in a vessel is outside pre-selected limits and providing a signal indicative thereof at a remote locale where the method includes detecting vessel pressure and providing a first output signal which is indicative thereof, comparing the first output signal to a reference and providing a second output signal when the first output signal and the reference are in a pre-selected relationship indicative of vessel pressure being outside the pre-selected limits and generating and transmitting a third output signal indicative of the vessel pressure being outside the pre-selected limits responsively to the second output signal resulting from the comparison. In this method aspect of the invention, vessel pressure is preferably detected continuously.

In this method aspect of the invention, the first output signal is preferably provided as a first electrical output signal and is further preferably provided as a first electrical output D.C. voltage signal.

In this method aspect of the invention, the third output signal is preferably provided either as an electrical output signal or as an optical output signal.

In a still further another one of its aspects this invention provides apparatus for sensing when pressure in a vehicle pneumatic tire or other pressure vessel(s) has dropped below a pre-selected minimum acceptable level and providing a signal indicative thereof at a remote locale. In this aspect of the invention, the apparatus preferably includes a transducer for detecting pressure in the tire or other pressure vessel and providing a first output signal which is indicative of that pressure. The apparatus preferably further includes a battery for providing electrical energy to the transducer, a comparator powered by the battery for comparing the first output signal from the transducer to a reference and providing a second output signal when the comparison indicates the first output signal is below the reference and hence the detected pressure is below a pre-selected acceptable minimum level. In this aspect the apparatus of the invention preferably further includes a relay receiving the second output signal from the comparator as input to the relay with the relay being energized thereby. This aspect of the invention preferably further includes a transmitter energized by actuation of the relay by the second output signal coming from the comparator, with the transmitter providing a third output signal to a remote receiver with the third output signal provided by the transmitter indicating pressure in the tire or other vessel being below the pre-selected minimum acceptable level.

In this aspect of the invention, the transducer preferably is one which continuously detects pressure in the tire or other pressure vessel.

The first output signal provided by the transducer is preferably is a first electrical output signal and most preferably an electrical voltage signal. The second output signal coming from the comparator is preferably an electrical output signal and is most preferably an electrical voltage output signal.

In another one of its aspects this invention provides a method for continuously sensing when pressure in a pneumatic tire or other pressure vessel(s) is below a pre-selected level and providing a signal indicative thereof at a remote locale where the method preferably includes the steps of detecting pressure in the tire or other pressure vessel and providing a first output signal which is indicative of the detected pressure, comparing the first output signal to a reference and providing a second output signal when the first output signal and the reference are in a pre-selected relationship indicative of pressure in the tire or other pressure vessel(s) being below a pre-selected acceptable level and thereafter generating and transmitting a third output signal indicative of the pressure in the tire or other pressure vessel(s) being below the pre-selected acceptable level responsively to the second output signal resulting from the comparison function.

In this method aspect of the invention, pressure is preferably detected continuously.

In this method aspect of the invention, the first output signal provided upon detection of the pressure is preferably a first electrical output signal and is most preferably an electrical output voltage signal.

In yet another of its aspects this invention embraces an integrated monolithic circuit chip which is preferably adapted for mounting on a wheel of a multi-wheeled highway vehicle for transporting passengers, cargo or both, where the chip includes a transducer connected to one of the wheels for sensing pressure in a tire mounted on the wheel and providing an output signal indicative of the pressure, a comparator receiving the output signal for comparing the output signal from the transducer to a reference and providing a second output signal indicative of the comparison and a transmitter receiving the second output signal produced by the comparator and sending tire pressure information in the second output signal to a locale preferably removed from the chip.

In still another one of its aspects, this invention embraces an integrated solid state monolithic chip for sensing when pressure in a vehicle tire or other pressure vessel is outside of a pre-selected acceptable range and providing a signal indicative thereof at a preferably remote locale, where the chip is preferably mountable on a rim of the vehicle wheel on which the tire is mounted or on some other pressure vessel, where the chip preferably includes means connected to the tire or other pressure vessel for sensing pressure therein and providing a first output signal indicative of the sensed pressure, means, receiving the first output signal indicative of the pressure of the tire or other pressure vessel, for comparing the first pressure indicative signal to at least one reference and providing a second output signal indicative of the comparison and means receiving the second output signal for transmitting the signal to a locale preferably removed from the chip.

These and other features and objects of the invention will be more fully understood from the following detailed description of the preferred embodiments, which should be read in light of the accompanying drawings.

BRIEF DESCRIPTION OF THE DRAWINGS

The accompanying drawings are incorporated into and form a part of the specification.

FIG. 2b is a horizontal cross-section taken through the vertical mid-point of the dual-wheel tire assembly illustrated in FIG. 2a, of the mechanical tire pressure indication apparatus and dual-wheel tire assembly shown in FIG. 2a.

FIG. 4b is a vertical sectional view taken at the wheel horizontal midpoint showing the aerodynamic wheel cover and associated mechanical tire pressure indication apparatus shown in FIG. 4a.

Figure 1:
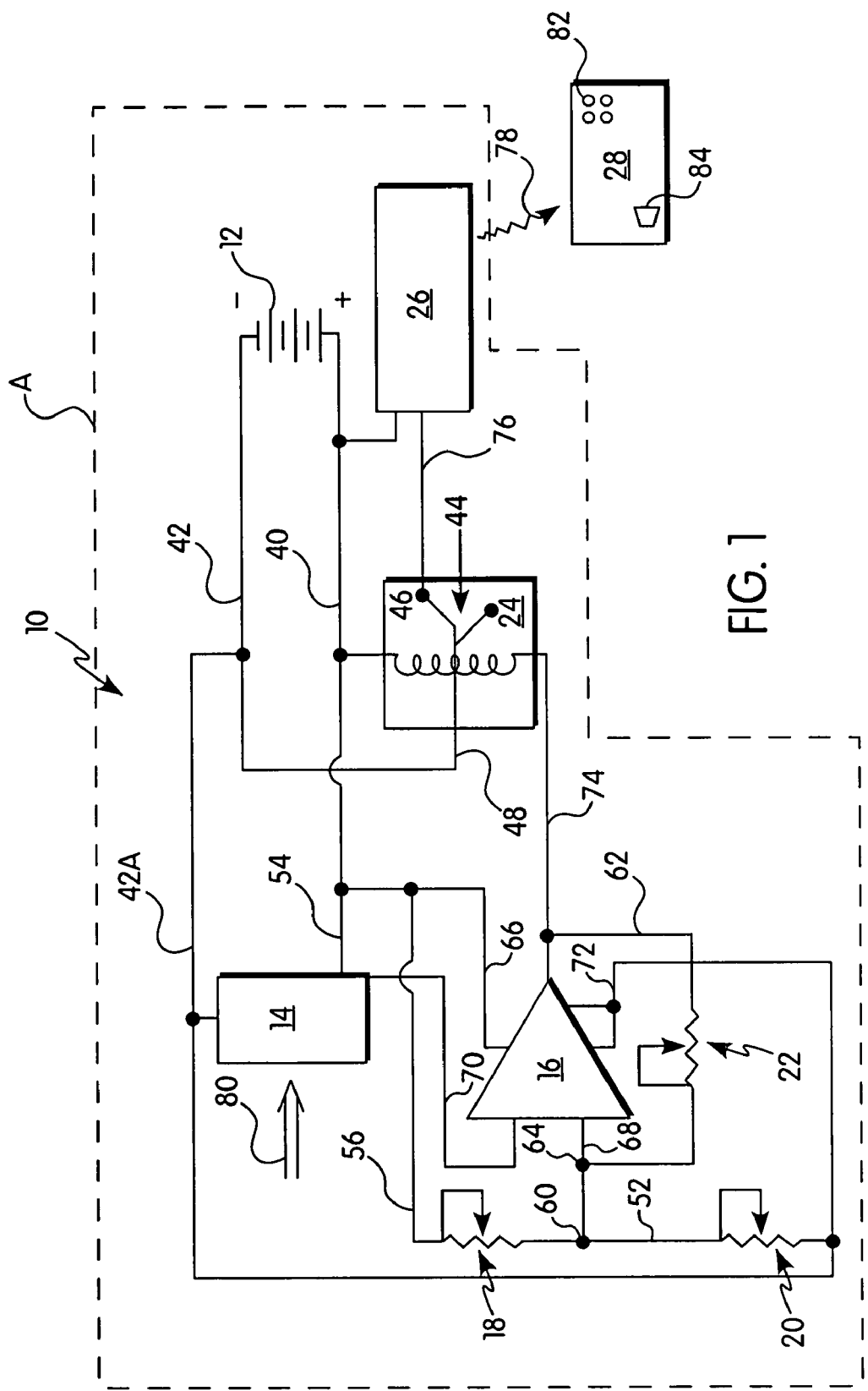
FIG. 1 is a schematic representation of electrically powered apparatus for sensing when pressure in a tire or other pressure vessel is below a pre-selected level and providing a signal indicative thereof, preferably at a remote locale.

DETAILED DESCRIPTION OF THE PREFERRED EMBODIMENTS AND BEST MODE KNOWN FOR PRACTICE OF THE INVENTION

In describing the invention as illustrated in the drawings, specific terminology is used. However, the invention is not limited to the specific terms so selected, and it is to be understood that unless otherwise stated each specific term includes all technical equivalents which operate in a similar manner to accomplish a similar purpose.

Referring to the drawings in general and to FIG. 1 in particular, electrical apparatus for sensing pressure in a tire or other closed vessel and transmitting a signal indicative of the sensed pressure to a remote locale is illustrated in FIG. 1 and designated generally 10. Apparatus 10 includes a battery, designated 12, a pressure transducer designated 14, a preferably chip-based comparator designated 16, a relay designated 24, a transmitter designated 26 and a optionally but preferably remote receiver designated 28.

Figure 4A:
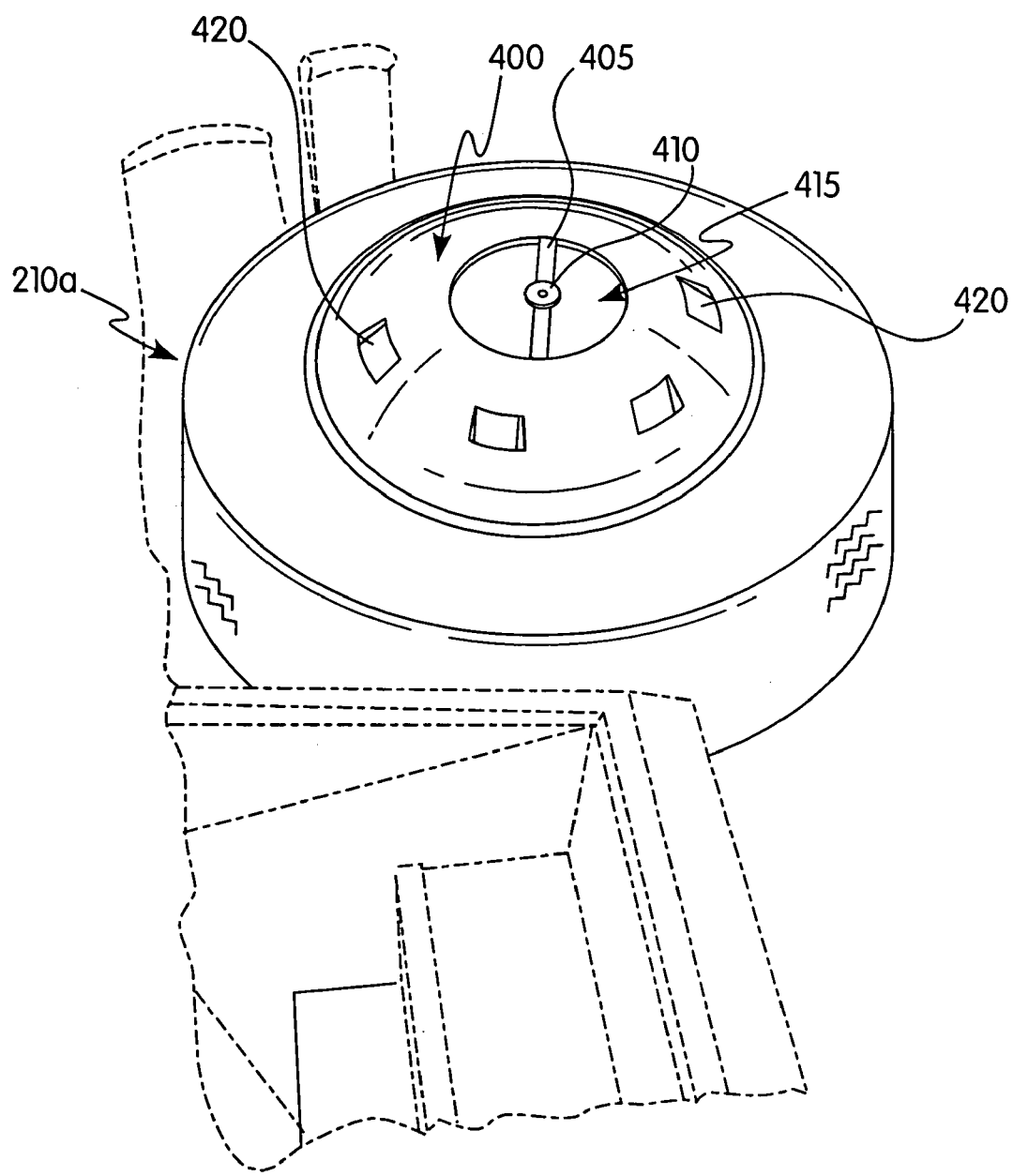
FIG. 4a is a perspective view of an aerodynamic wheel cover mounted on a wheel carrying pneumatic tire, with an associated mechanical tire pressure indication apparatus.
Figure 4B:
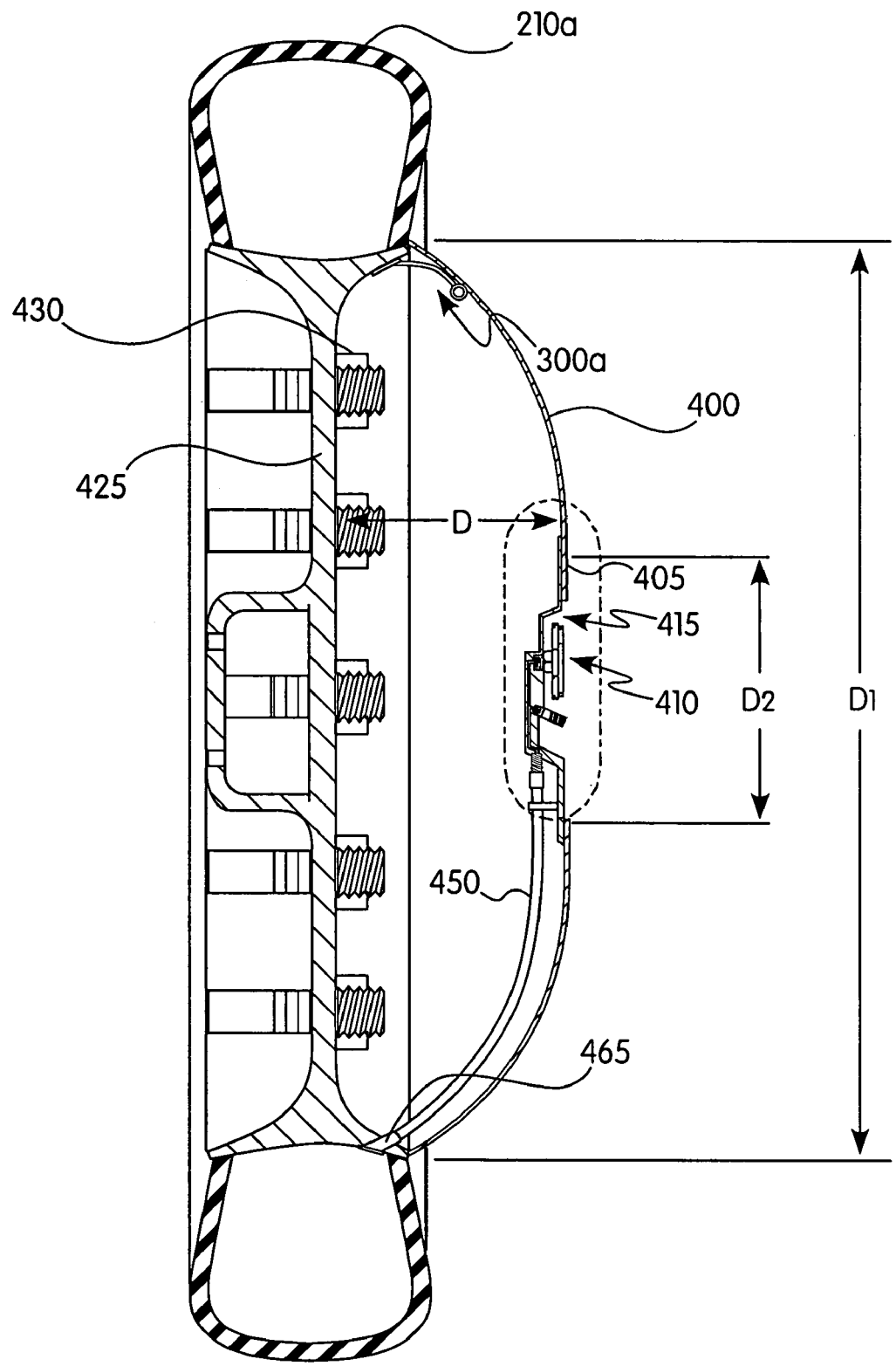
Figures 4C, 4D:
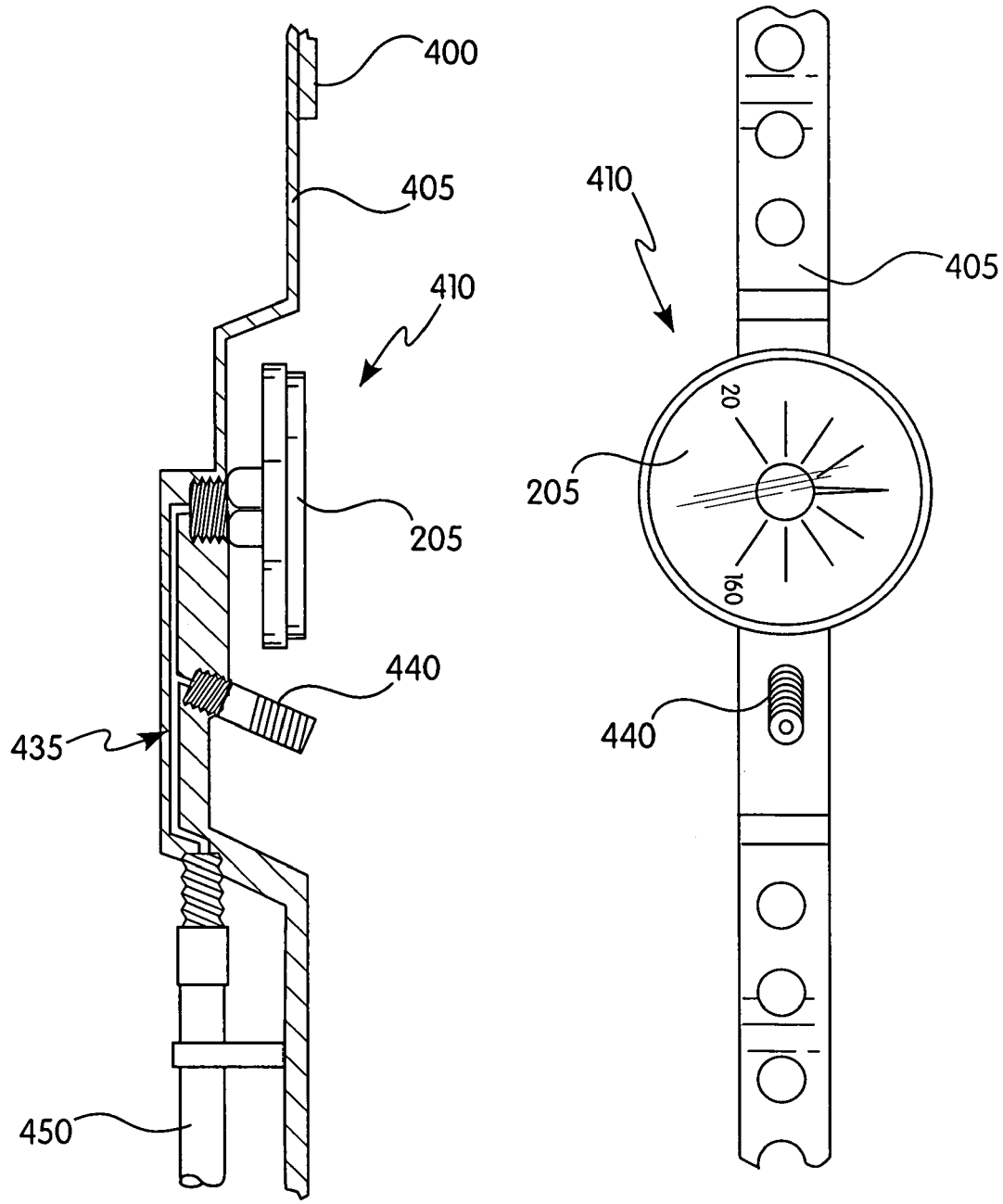
FIG. 4c is a broken enlarged partially sectioned top view of the pressure sensor assembly portion of the mechanical tire pressure indication apparatus shown in FIGS. 4a and 4b.
FIG. 4d is a broken enlarged right side view, relative to FIG. 4c, of the pressure sensor assembly and associated mechanical tire pressure indication apparatus shown in FIGS. 4a through 4c.
Figure 4E:
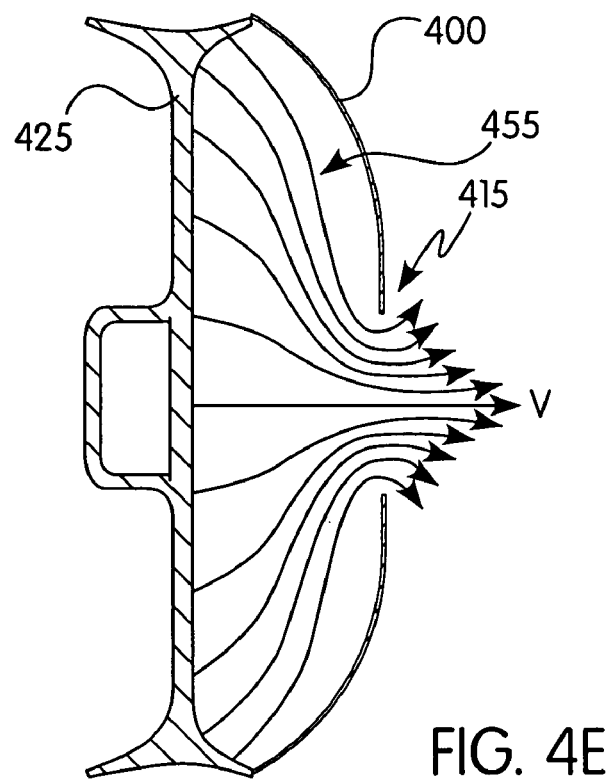
FIG. 4e is an illustration of a airflow outwardly from the inside of the aerodynamic wheel cover shown in FIGS. 4a through 4d.
Figure 4F:
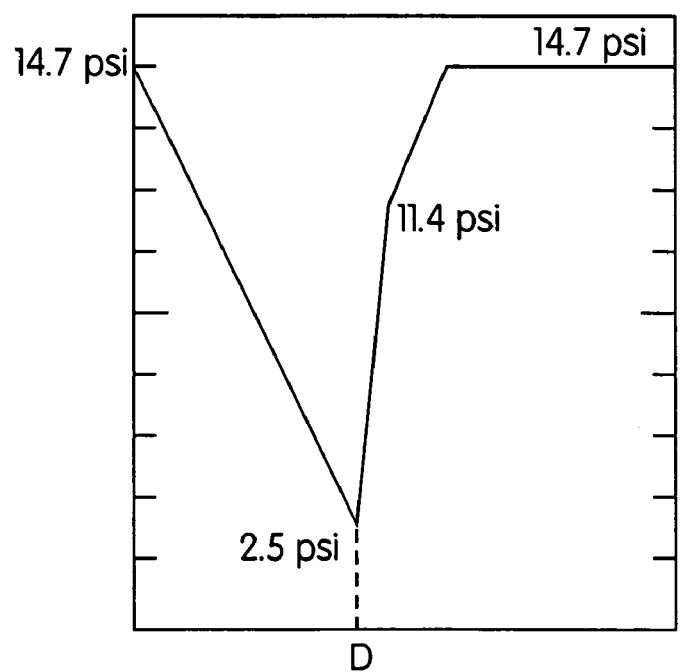
FIG. 4f is a graph of air pressure versus position as air travels through the aerodynamic wheel cover shown in FIGS. 4a through 4e, with the graph depicting pressure for a horizontal stream line illustrated in FIG. 4e.
Figure 5:
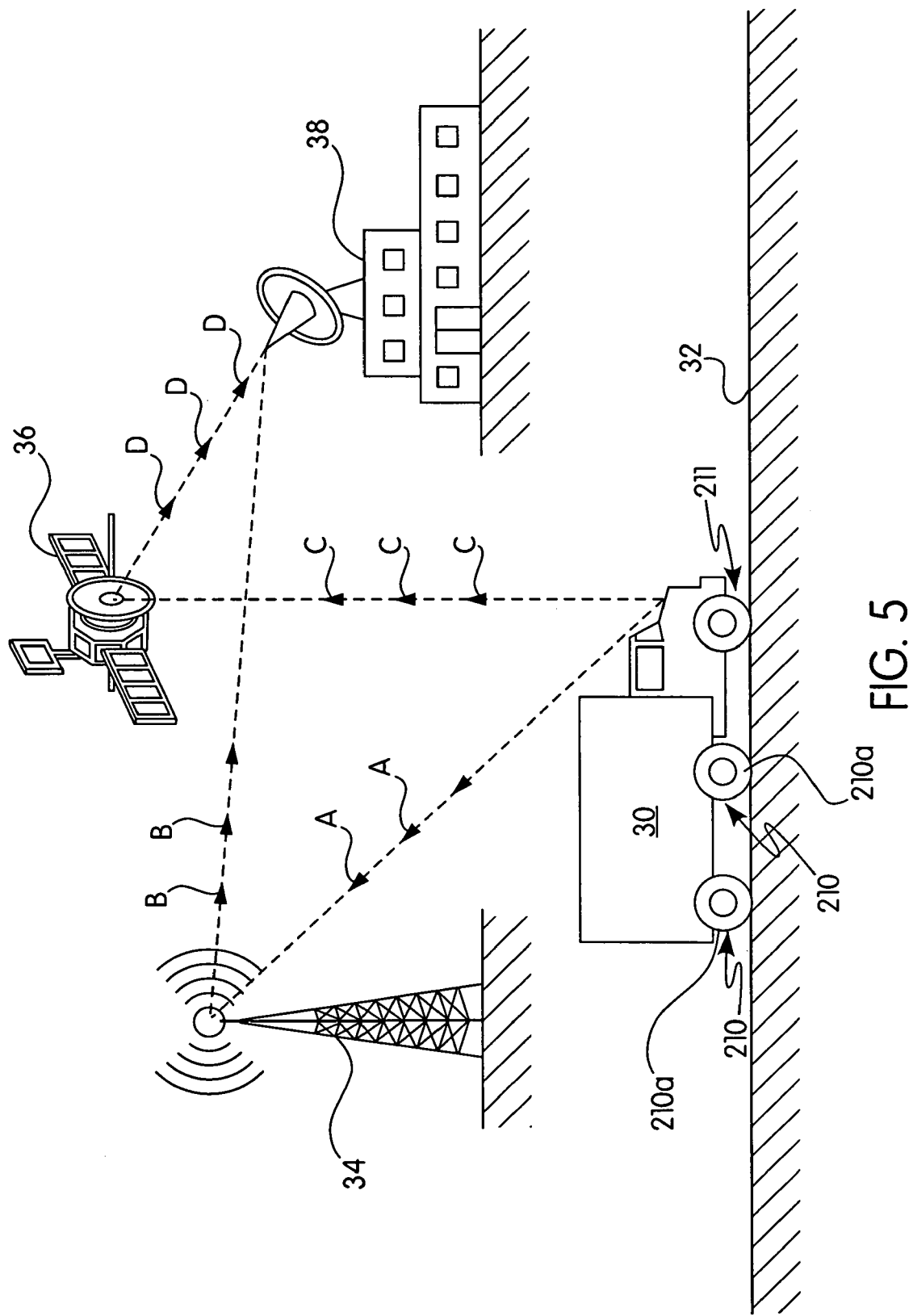
FIG. 5 is a schematic representation of apparatus for sensing when pressure in a tire or other pressure vessel is below a pre-selected acceptable level and providing a signal thereof a remote locale.

Referring further to FIG. 1 and also to FIG. 5, apparatus 10, specifically the components thereof other than receiver 28, is preferably mounted on a multi-wheel over-the-highway vehicle, most preferably a truck such as is designated generally 30 in FIG. 5. Most preferably one apparatus 10 is provided for each wheel, each of which has a pneumatic tire mounted thereon, of truck 30. Dual wheel assemblies of truck 30 are designated generally 210, consistently with the item numbering in FIGS. 2 through 4, discussed below, with an outer wheel of each assembly 210 being designated 210a and inner wheel of each assembly 210 being designated generally 210b. Single wheel assemblies of truck 30 are designated 211 in FIG. 5. Each dual wheel assembly 210 is preferably equipped with two of apparatus 10, specifically the components enclosed within dotted line A, in FIG. 1.

During operation of electrical apparatus 10 for sensing pressure and transmitting a signal indicative of the same to a remote locale, as such apparatus is designated generally 10 in FIG. 1, the output signal, sometimes referred to as a "third" signal in the appended claims, is preferably transmitted by transmitter 26 carried by truck 30 to a relay tower designated generally 34 in FIG. 5, from whence the signal is preferably relayed to a ground station designated generally 38 in FIG. 5. Alternatively, the signal transmitted by transmitter 26 mounted on truck 30 may be transmitted to a relay satellite designated generally 36 in FIG. 5, from whence the signal may in turn be relayed to ground station 38. For purposes of clarity, the path of a signal from truck 30 to relay tower 34 is indicated by arrows A in FIG. 5; the path of the signal relayed from relay tower 34 to ground station 38 is indicated by arrows B in FIG. 5; the alternative path of a signal from transmitter 26 and truck 30 to relay satellite 36 in FIG. 5 is indicated by arrows C while the alternative path of a signal relayed from relay satellite 36 to ground station 38 in FIG. 5 is indicated by arrows D.

While the preferred implementation of the invention is to provide a signal indicative of vehicle tire pressure at a remote locale such as ground station 38, it is also within the contemplation of the invention to provide the vehicle tire pressure information to a display within the cab or driver compartment of the truck or other vehicle having tires with pressure being monitored by the apparatus and methods according to the invention. In such case, the receiver indicated as 28 in FIG. 1 might be on the dashboard of the vehicle and include a visible display, preferably in digital form, of the tire pressure as monitored.

Referring again to FIG. 1, first, second and third potentiometers are designated 18, 20, 22 respectively and are connected to and serve to adjust the reference signal input to preferably chip-based comparator 16 in a manner described below.

Still referring to FIG. 1, battery 12 is preferably a six-volt battery providing input power to transmitter 26, transducer 14 and other circuit elements as described below via main power line 40 shown in FIG. 1. Negative, i.e. ground, voltage from battery 12 is provided to the various components via return line 42 where return line 42 feeds a signal input terminal, designated 48, of relay 24 for actuation of an internal switch, designated generally 44 and located within relay 24, upon a coil 46 of relay 24 being energized. A branch 42a of return power line 42 provides negative, i.e. ground, voltage for pressure transducer 14 and also provides, through potentiometers, a portion of the reference voltage supplied to comparator 16. As illustrated in FIG. 1, branch 42a is connected with negative biasing potentiometer 20 and provides negative voltage, namely ground, at one of inputs to negative biasing potentiometer 20. This negative voltage applied at one end of the wound portion of negative biasing potentiometer 20 passes through the winding and may be picked off by a pointer portion 50 of negative biasing potentiometer 20 thereby to control the reference voltage supplied via negative biasing potentiometer 20 at the potentiometer output terminal opposite the potentiometer input terminal at which the negative or ground voltage is supplied by branch 42a. This output terminal of negative biasing potentiometer 20 is designated 52 in FIG. 1.

Still referring to FIG. 1, main or positive power line 40 provides input power not only to transducer 14 as indicated by an input power line 54 leading to transducer 14 and connected to main or positive power line 40, but also provides power, namely positive voltage, to the input terminal of positive biasing potentiometer 18 where such input terminal or line is denoted 56 in FIG. 1. Output from the positive biasing potentiometer 18, which is typically reduced from the full 6 volt voltage preferably supplied by battery 12 to positive power line 40, is combined together with the output from negative biasing potentiometer 20, which is preferably above the ground input to negative biasing potentiometer 20, with these two outputs being provided and combined at node 60 for input to comparator 16.

A feedback loop is also provided for comparator 16 where line 62 in FIG. 1 is illustrated carrying signal as output from comparator 16 and providing the same as input to feedback potentiometer 22. Output from feedback potentiometer 22 is provided at node 64 where such output from feedback potentiometer 22 is combined with the combined output from negative and positive biasing potentiometers 20 and 18 received from node 60, with all of three outputs as combined together being provided as the input reference signal to comparator 16 via input reference line 68 leading to comparator 16.

Comparator 16 further receives, as input power, voltage from main or positive power line 40 via input power line 66 illustrated in FIG. 1. Comparator 16 further receives the signal output by transducer 14 via signal input line 70 illustrated in FIG. 1.

Comparator 16 still yet further receives voltage from the negative terminal of battery 12, which voltage typically is ground, via input line 72 illustrated in FIG. 1.

Comparator 16 provides output via output signal line 74 connecting to coil 46 of relay 24. Line 62 connected to output signal line 74 from comparator 16 picks off output signal from comparator 16 and provides the same as feedback input to potentiometer 22 in order to adjust the bias of reference signal provided to comparator 16 via reference signal input line 68 leading to comparator 16.

During operation of the circuitry illustrated in FIG. 1, transducer 14 typically continuously monitors pressure of a given tire of interest. With such continuous monitoring, transducer 14 provides, typically, a continuous output signal via line 70 for input to comparator 16. If the voltage provided by input signal line 70 from transducer 14 to comparator 16 is lower than the level of the reference voltage provided via input reference signal line 68 to comparator 16, this indicates that pressure in the tire of interest has dropped below the selected set point and the comparator provides an output signal. Prior to the input signal provided via line 70 to comparator 16 being lower than the reference signal provided by line 68 to comparator 16, there is no output from comparator 16.

Output from comparator 16 energizes coil 46 of relay 24 by closing internal switch 44 within relay 24, resulting in relay 24 providing an output signal via line 76 as input to transmitter 26. This input signal actuates transmitter 26, causing transmitter 26 to send a signal to receiver 28 as indicated by squiggly arrow 78 in FIG. 1.

Tire pressure as input to transducer 14 is indicated schematically by double shafted arrow 80 in FIG. 1.

In the preferred implementation of the invention, all of the circuit elements enclosed within dotted line A in FIG. 1 are preferably configured on a single miniature circuit board or even as a discrete integrated circuit on a chip. Obviously, implementation as a chip enhances reliability since shock loading of the circuitry is unavoidable when the circuitry is mounted on the wheel of a vehicle, especially when the circuitry is mounted on the wheel of an over-the-road highway truck.

In one implementation of the circuitry illustrated in FIG. 1, the transducer has been a Motorolla MPX5999. Battery 12 has been a six-volt battery. The transducer has been an 8101(LM) 31IN available from National Semiconductor. The relay has been a TN2-3V ATN201 available from NIAS. The transmitter has been an SL-6194-TX-A REVC available from Heath/Zenith. The receiver has been a SL-6153A REVA also available from Heath/Zenith. Potentiometers 18, 20 and 22 have been 3006P101M-10Z potentiometers available from Cermet. With this implementation, the circuitry is well adapted to monitor pressure in automobile tires where the pressure threshold below which low pressure is detected and the alarm signal is set is rarely above about 35 psi.

Biasing potentiometers 18 and 20 may be one kilo ohm potentiometers while potentiometer 22 may be a ten kilo-ohm potentiometer preferably set at a 2.2 kilo ohm level. Relay 24 may be a three (3) volt relay while transmitter 26 is desirably capable of operating enough at up to twelve (12) volts input.

Transmitter 26 and receiver 28 have also been adapted from a Radio Shack remote control garage door opener. Receiver 28 has included an LED display which is depicted schematically in FIG. 1 and designated 82 and has also included a speaker to provide an audible output tone upon receipt of a signal by receiver 28 from transmitter 26. The speaker is illustrated schematically in FIG. 1 and designated generally 84. The light emitting diode 82 on the Radio Shack remote control door opener provides a visible signal when the pressure in the tire of interest, which pressure is provided as input to transducer 14, drops below the pre-selected acceptable level. Similarly, speaker 84 of receiver 28 provides an audible alarm indicating drop of pressure in the tire of interest below the pre-selected acceptable level.

In this implementation of the invention, receiver 28 is desirably placed on the dashboard in the cab of a truck having the tire pressure monitoring apparatus within dotted line X in FIG. 1 mounted on one of the wheels and operating to monitor the pressure of a tire mounted on that wheel. It is within the purview of the invention to provide the signal indicating a low pressure tire through the radio in an automobile or truck passenger compartment. It is similarly within the purview of the invention to provide such a low tire warning using the alphanumeric display associated with the radio or an onboard vehicle maintenance warning system of the type common in many newer automobiles. Similarly, it is within the purview of the invention to illuminate a light on the dashboard, perhaps in the radio tuning band or elsewhere within the radio, to indicate a low tire has been sensed by apparatus of the invention. Desirably, the signal provided by the invention may be integrated into an onboard communication system such as that sold by General Motors Corporation under the trademark OnStar.

In the implementation of the apparatus aspect of the invention as illustrated in FIG. 1, the elements within dotted line A are desirably furnished for each tire pressure to be monitored.

It is further within the purview of the invention to use the apparatus and method to monitor any differential gas pressure, not just pressure in pneumatic tires. Hence, the invention is applicable to a detection of low hydraulic pressure, gas pressure and other pressures as well as air pressure. Similarly, the values of the circuit elements, particularly the values of the potentiometers 18, 20, 22, may be varied to account for different conditions encountered by a vehicle in which the apparatus is installed.

The apparatus illustrated within dash line A in FIG. 1 is desirably attached to the rim of a wheel of interest using epoxy or some other mechanical attachment. If the apparatus is fastened to the tire assembly, specifically to the wheel rim, the apparatus can be balanced with the tire when the wheel is balanced.

It is further within the contemplation of the invention to implement the circuitry shown within dash line A in FIG. 1 as a single integrated chip with such chip mounted on a wheel rim, perhaps in a permanent fashion. Chip implementation obviously reduces the weight of the circuitry within dash line A in FIG. 1, thereby minimizing any difficulty or problem involved in balancing a wheel on which the chip would be mounted. The chip may be mounted on a bracket such as illustrated in FIG. 2e and designated 280. Mounting may be via adhesive, epoxy being preferred.

Further referring to the drawings of this application, the discrete circuit elements within dash line A in FIG. 1 may desirably be mounted on a single printed circuit board with such board being secured by screws or epoxy to a bracket structure such as 280 illustrated in FIG. 2e which in turn is secured to wheel rim 215 also illustrated in FIG. 2e.

Transducer 14 may be of several different types all within the purview of the invention. Specifically, transducer 14 may be of the type in which one plate moves in response to pressure changes, or may be of the inductive type in which a coil or core moves in response to pressure changes or may be of the piezoelectric type in which the piezoelectric crystal deforms in response to pressure and provides a electrical signal output proportional to such deformation. Another suitable pressure sensor for use in implementing the invention is the MPX5010 integrated pressure sensor available from Motorolla. This pressure sensor has a pressure range from 0 to 10,000 pounds absolute pressure, an output voltage ranging from 0.2 to 4.7 volt and further provides on-chip temperature compensation, calibration and signal conditioning.

As respects further applications of the pressure sensing and alarm aspect of the invention, the apparatus and method of the invention has applicability to pneumatic air systems of the type supplying air to pneumatic powered tools, spray booths, pneumatic robots and like. The method and apparatus further have applicability to air emergency systems such as those found in industry, hospitals and elsewhere where a loss of breathable air presents a hazardous condition. The invention has still further applicability to air exchange systems in offices and industrial facilities. The method and apparatus of the invention may be used with liquid, hydraulic or flammable gas and may utilize a bladder unit installed between the pressure side of the system to be monitored and the alarm.

While the apparatus of the invention has been illustrated as being battery powered, it is further within the purview of the invention to power the apparatus using solar power, with battery back-up, or with conventional electric service power, again with battery back-up.

Satellite control and adjustment of the apparatus for sensing when pressure is outside of a pre-selected acceptable range and providing a signal indicative there at a remote locale, is within the purview of the invention.

Yet another pressure sensor which is suitable for use is transducer 14 is the Motorolla MPX5999 integrated pressure sensor which can handle input pressures of up to 150 psi.

It is further within the contemplation of the invention to use the invention for monitoring and detection of low pressure in systems involving nitrogen, argon and carbon oxide for welding systems, gases used in automatic robotic equipment, orbital welding and the like, in automated equipment, on assembly lines and a nearly any industry including forging, molding, pressing, trimming, pneumatically powered or hydraulically powered rides in amusement parks, agricultural industry implements and the like.

By providing remote adjustment of the potentiometers in the circuitry of the invention as disclosed in FIG. 1, the apparatus can be modified remotely to be completely adjustable for different customers and different situations. It is within the contemplation of the invention to provide such remote adjustment by satellite control and other remote control such as via cellular telephone networks.

Figure 6:
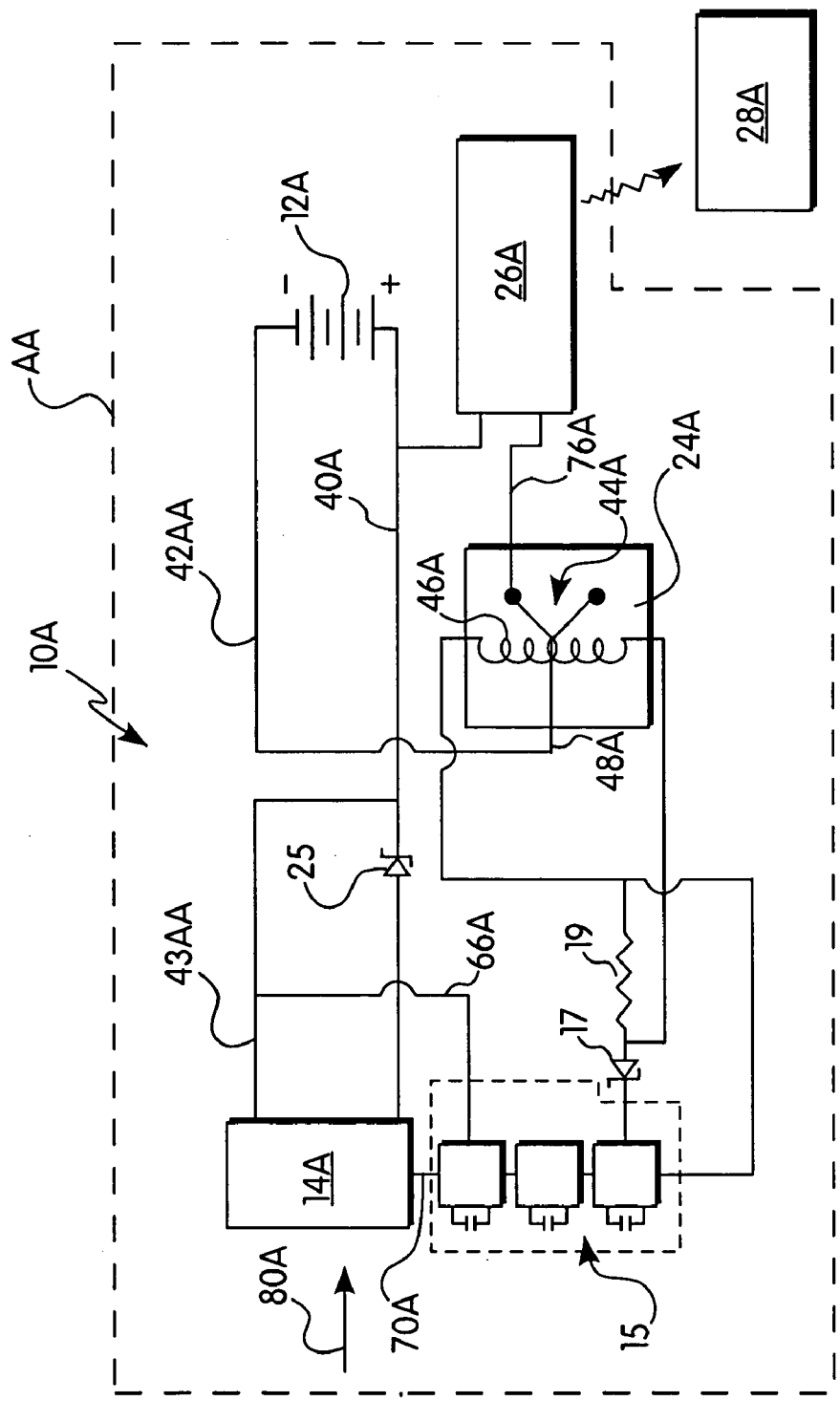
FIG. 6 is a schematic representation of an alternative embodiment of electrically powered apparatus for sensing when pressure in a tire or other pressure vessel is below a pre-selected level and providing a signal indicative thereof, preferably at a remote locale.

An alternative embodiment of electrical apparatus for sensing pressure in a tire or other closed vessel and transmitting a signal indicative of the sensed pressure to a remote locale is illustrated in FIG. 6 and designated generally 10A. Apparatus 10A includes a battery, designated 12A, a pressure transducer designated 14A, a relay designated 24A, a transmitter designated 26A and a optionally but preferably remote receiver designated 28A.

Referring further to FIG. 6 and also to FIG. 5, apparatus 10A, specifically the components thereof other than receiver 28A, is preferably mounted on a multi-wheel over-the-highway vehicle, most preferably a truck such as is designated generally 30 in FIG. 5. Most preferably one apparatus 10A is provided for each wheel, each of which has a pneumatic tire mounted thereon, of truck 30. Dual wheel assemblies of truck 30 are designated generally 210, consistent with the item numbering in FIGS. 2 through 4, discussed below, with an outer wheel of each assembly 210 being designated 210a and inner wheel of each assembly 210 being designated generally 210b. Single wheel assemblies of truck 30 are designated 211 in FIG. 5. Each dual wheel assembly 210 is preferably equipped with two of apparatus 10A, specifically the components enclosed within dotted line AA in FIG. 6.

During operation of electrical apparatus 10A for sensing pressure and transmitting a signal indicative of the same to a remote locale, as such apparatus is designated generally 10A in FIG. 6, the output signal, sometimes referred to as a "third" signal in the appended claims, is preferably transmitted by transmitter 26A carried by truck 30 to a relay tower designated generally 34 in FIG. 5, from whence the signal is preferably relayed to a ground station designated generally 38 in FIG. 5. Alternatively, the signal transmitted by transmitter 26A mounted on truck 30 may be transmitted to a relay satellite designated generally 36 in FIG. 5, from whence the signal may in turn be relayed to ground station 38. For purposes of clarity, the path of a signal from truck 30 to relay tower 34 is indicated by arrows A in FIG. 5; the path of the signal relayed from relay tower 34 to ground station 38 is indicated by arrows B in FIG. 5; the alternative path of a signal from transmitter 26 and truck 30 to relay satellite 36 in FIG. 5 is indicated by arrows C while the alternative path of a signal relayed from relay satellite 36 to ground station 38 in FIG. 5 is indicated by arrows D. All of this is as discussed above with respect to FIG. 1.

Output signal from transducer 14A is provided to a three-stage charge pump designated generally 15 and enclosed within a dotted line in FIG. 6. The compactors forming a portion of charge pump 15 are preferably 10 microfarad compactors. Output from charge pump 15A is provided via device 17 through resistor 19 to coil 46A of relay 24A. A device functionally similar to device 17 is denoted 25 in FIG. 6. Device 17 preferably has a break point of 11.5 volts while device 25 preferably has a break point of 5.1 volts. Battery 12A is preferably a 12 volt battery with transmitter 26A being a 12 volt transmitter, preferably transmitting at 418 megahertz to receiver 28A. Relay 24A is a 12 volt relay; the two ground terminals on either side of input line 48A to relay 24A are illustrated but not numbered in FIG. 6 for drawing clarity.

The circuit illustrated in FIG. 6 is well adapted for detecting input pressures indicated by arrow 80A of up to 100 PSI, which are pressures in the range normally applied to the pneumatic tires of an over-the-highway truck.

Figure 7:
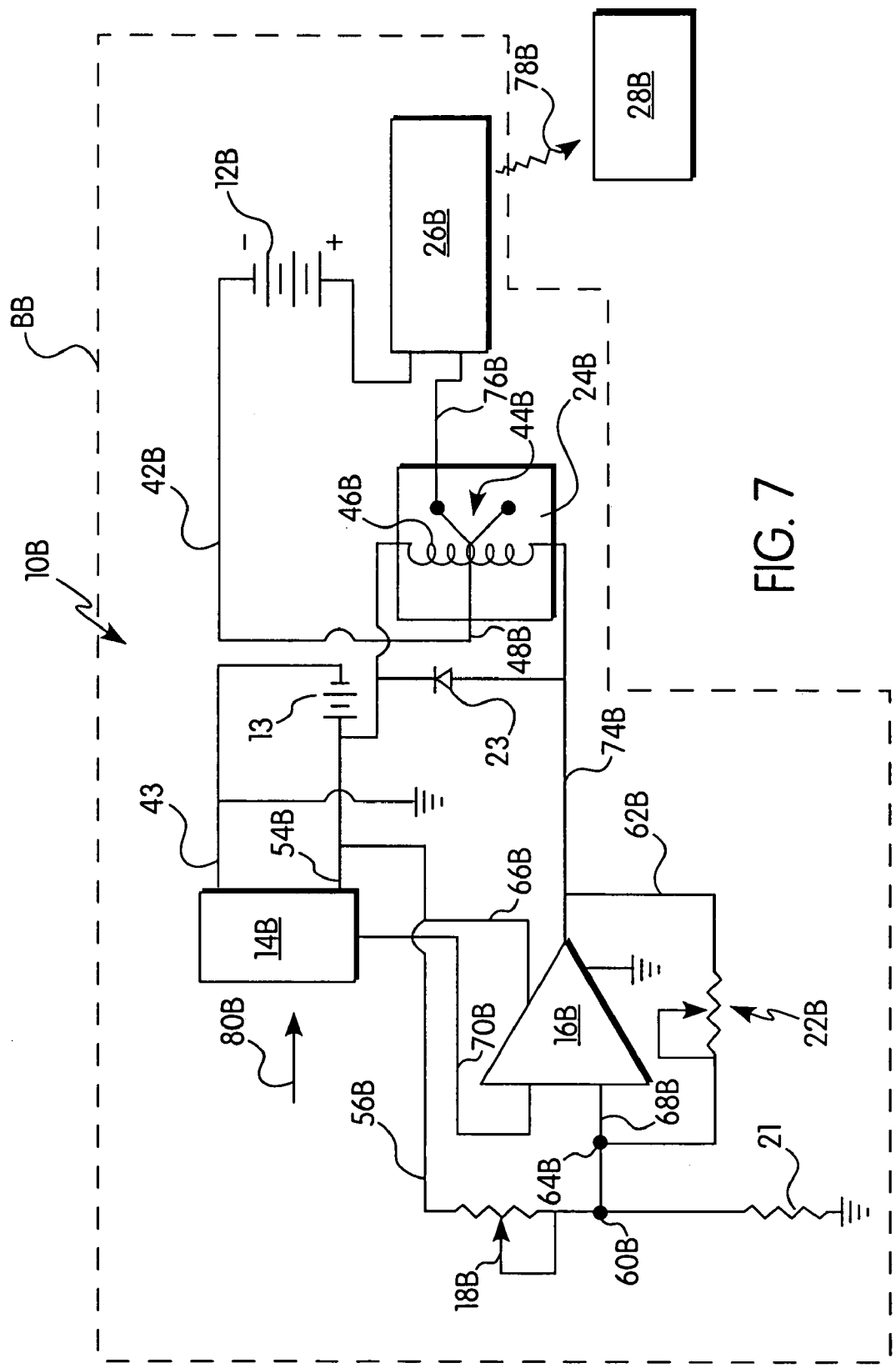
FIG. 7 is a schematic representation of a second alternative embodiment of electrically powered apparatus for sensing when pressure in a tire or other pressure vessel is below a pre-selected level and providing a signal indicative thereof, preferably at a remote locale.

A second alternative embodiment of electrical apparatus for sensing pressure in a tire or other closed vessel and transmitting a signal indicative of the sensed pressure to a remote locale is illustrated in FIG. 7 and designated generally 10B. Apparatus 10B includes a first battery designated 12B, a pressure transducer designated 14B, a preferably chip-based comparator designated 16B, a relay designated 24B, a transmitter 26B and an optionally but preferably remote receiver designated 28B.

Referring further to FIG. 7 and also to FIG. 5, apparatus 10B, specifically the components thereof other than receiver 28B, is preferably mounted on a multi-wheel over-the-highway vehicle, most preferably a truck such as is designated generally 30 in FIG. 5. Most preferably one apparatus 10B is provided for each wheel, each of which has a pneumatic tire mounted thereon, of truck 30. Dual wheel assemblies of truck 30 are designated generally 210, consistent with the item numbering in FIGS. 2 through 4, with an outer wheel of each assembly 210 being designated 210*a* and an inner wheel of each assembly 210 being designated generally 210*b*. Single wheel assemblies of truck 30 are designated 211 in FIG. 5. Each dual wheel assembly 210 is preferably equipped with two of apparatus 10B, specifically the components enclosed within dotted line BB in FIG. 7.

During operation of electrical apparatus 10B for sensing pressure and transmitting a signal indicative of the same to a remote locale, as such apparatus is designated generally 10B in FIG. 7, the output signal, sometimes referred to as a "third" signal in the appended claims, is preferably transmitted by transmitter 26B carried by truck 30 to a relay tower designated generally 34 in FIG. 5, from whence the signal is preferably relayed to a ground station designated generally 38 in FIG. 5, with operation as described above with reference to FIGS. 1 and 5.

Referring still to FIG. 7, two potentiometers designated 18B and 22B respectively are connected to and serve to adjust the reference signal input to preferably chip-based comparator 16B in a manner described below.

Still referring to FIG. 7, battery 12B is preferably a twelve-volt battery providing input power to transmitter 26B, via main power line 40B shown in FIG. 7. Negative, i.e. ground, voltage from battery 12B is provided via line 42B where line 42B feeds a signal input terminal, designated 48B, of relay 24B for actuation of an internal switch, designated generally 44B and located within relay 24B, upon a coil 46B of relay 24B being energized. As further illustrated in FIG. 7, a second battery 13 provides power to transducer 14B via negative power line 43 and positive power line 54B. Additionally, battery 13 powers comparator 16B with positive voltage being provided to comparator 16B by input line 66B. Additionally, positive voltage from battery 13 as modified by potentiometer 18B contributes to the reference signal input to comparator 16B via line 68B with the positive voltage, after modification by potentiometer 18B, going through node 60, which node is connected to ground via a resistor 21.

Positive voltage from battery 13 is also provided to coil 46B of relay 24B; diode 23 is in parallel with relay coil 24B as illustrated on FIG. 7. Output from positive biasing potentiometer 18B, which is the 6 volts preferably supplied by battery 13 to positive power line 54B, is provided at node 60B for input to comparator 16B.

A feedback loop is also provided for comparator 16B where line 62B in FIG. 7 is illustrated carrying signal as output from comparator 16B and providing the same as input to feedback potentiometer 22B. Output from feedback potentiometer 22B is provided at node 64B where such output from feedback potentiometer 22B is combined with the output from positive biasing potentiometer 18B received from node 60, with these outputs as combined together being provided as the input reference signal to comparator 16B via input reference line 68B leading to comparator 16B.

As noted, comparator 16B further receives, as input power, voltage from positive power line 54B via input power line 66B illustrated in FIG. 7. Comparator 16 further receives the signal output by transducer 14B via signal input line 70B illustrated in FIG. 7.

Comparator 16B provides output via output signal line 74B connecting to coil 46B of relay 24B. Line 62B connected to output signal line 74B from comparator 16B picks off output signal from comparator 16B and provides the same as feedback input to potentiometer 22B in order to adjust the bias of the reference signal provided to comparator 16B via reference signal input line 68B leading to comparator 16B.

During operation of the circuitry illustrated in FIG. 7, transducer 14B typically continuously monitors pressure of a given tire of interest. With such continuous monitoring, transducer 14B provides, typically, a continuous output signal via line 70B for input to comparator 16B. If the voltage provided by input signal line 70B from transducer 14B to comparator 16B is lower than the level of the reference voltage provided via input reference signal line 68B to comparator 16B, this indicates pressure in the tire of interest has dropped below the selected set point and comparator 16B accordingly provides an output signal. Prior to input signal provided via line 70B to comparator 16B being lower than the reference signal provided by line 68B to comparator 16B, there is no output from comparator 16B.

Output from comparator 16B energizes coil 46B of relay 24B by closing internal switch 44B within relay 24B, resulting in relay 24B providing an output signal via line 76B as input to transmitter 26B. This input signal actuates transmitter 26B, causing transmitter 26B to send a signal to receiver 28B as indicated by squiggly arrow 78B in FIG. 7.

Tire pressure as input to transducer 14B is indicated schematically by arrow 80B in FIG. 7.

All of the circuit elements enclosed within dotted line BB in FIG. 7 are preferably configured on a single printed circuit board or even as a discrete integrated circuit on a chip. Obviously, implementation as a chip enhances reliability since shock loading of the circuitry is unavoidable when the circuitry is mounted on the wheel of a vehicle, especially when the circuitry is mounted on the wheel of an over-the-road highway truck.

In the implementation of the invention in its electrical form, both the sending circuit and the receiving unit are preferably adjustable in the frequency bands for the sent and receive signals. The sending unit is preferably partially adjustable to operate on responsively to different air pressures, creating a multi-use unit. The unit can preferably be updated to be programmable by satellite if a directional antenna is used. The receiver can be hardwired to a power supply or have a replaceable power supply such as a battery, or both. The receiver may have colored light emitting diodes, audible alarms and the like, with a customer selecting among these options.

The transmitter is preferably energized by the associated power source, namely the battery, and has air pressure set within the unit which, when within the preset parameters, will permit the transmitter to respond when the pressure drops from the preset parameter or level. Thus in such case the transmitter sends out a signal to the receiver alerting the customer or driver to an alarm on the receiver, where the alarm is preferably both audible and visible.

Normally, when the apparatus is powered by its battery source and connected to the air supply, the unit is in a standby mode. A change in air pressure takes the unit out of the standby setting, causing the transducer to transmit the electrical voltage through the circuit energizing the relay causing the transmitter to respond and transmit a preset frequency alarm to the receiver through the atmosphere thereby alarming a customer. These units can be combined in various arrays as per individual customer requirements.

It is further within the purview of the invention to provide a sensor for the temperature of the tire and to compare the sense to temperature to a pre-selected maximum temperature value and provide an alarm signal if the temperature exceeds the pre-selected allowable maximum temperature. This information can be provided with the low pressure alarm to provide further safety when used as a part of the tire pressure monitoring system. It is further within the purview of the invention to detect low battery voltage and provide an alarm when the battery voltage reaches such a low level that system performance may be compromise. This may also be incorporated into the alarm signal.

With reference principally to FIGS. 2a through 2e, a mechanical tire pressure indication system is shown and designated generally 200. A dual-tire wheel assembly 210 comprises two tire-carrying wheels assembled back to back, including an outside wheel 210a and an inside wheel 210b. Mechanical tire pressure indication system 200 is preferably mounted on outside wheel 210a and preferably comprises a pair of Bourdon-type tire pressure gauges 205, each mounted on an inner periphery 215 of outside wheel 210a by a valve retention/fill assembly 220 in a manner described below. Each valve retention/fill assembly 220 is preferably connected to one of the conventional rim-attached tire fill-valves extending from the rims of outside wheel 210a and inside wheel 210b to gauges 205.

Figure 2A:
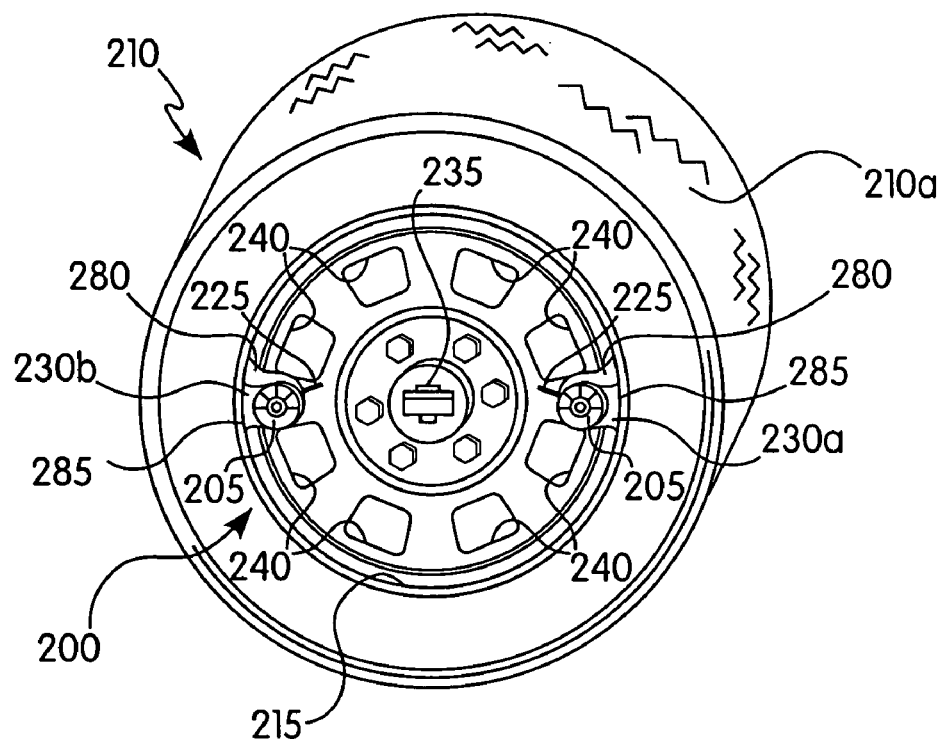
FIG. 2a is a perspective view of a mechanical tire pressure indication apparatus mounted to the inner periphery of the outside wheel of a dual-wheel tire assembly.

As shown in FIG. 2a an outside wheel indicator 230a and an inside wheel indicator 230b may be located on inner periphery 215 of outside wheel 210a proximate valve assemblies 220 to easily indicate to the truck operator, an inspector or other party, which tire is possibly under inflated or over inflated as shown by a gauge 205 and which valve stem 225 should be used to bring pressure for that tire to normal. It is very advantageous to a truck operator to have pressure gauge 205, monitoring tire pressure, at eye level as he bends down to increase or relieve tire pressure.

Pressure gauge 205 preferably has an analog display to aid the operator in filling the tire to an exemplary optimal pressure of one hundred (100) pounds per square inch, which is typical for an over the road truck. Any suitable pressure range and optimal pressure point is within the contemplation of the invention. Outside wheel indicator 230a and inside wheel indicator 230b are preferably formed as a plates which are riveted to inner periphery 215 of outside wheel 210a or otherwise secured in any suitable desired manner. Alternatively, outside wheel indicator 230a and inside wheel indicator 230b may be adhesive decals or emblems, a mark stamped into inner periphery 215 of outside wheel 210a, or formed as an integral part of valve assembly 220.

Figure 2B:
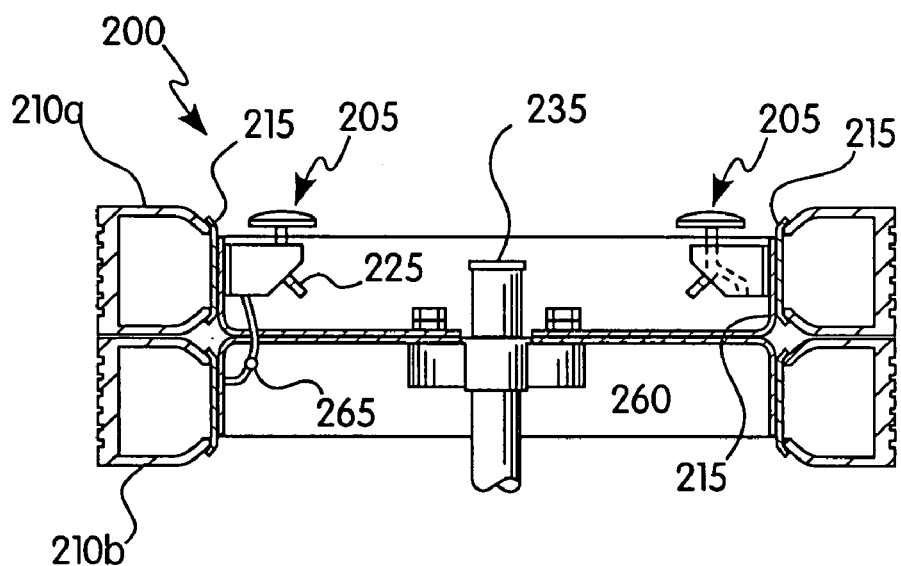

Continuing with reference principally to FIGS. 2a through 2b, dual wheel assembly 210 has an associated odometer 235 which preferably is a commercially Hubodometer odometer mounted on the axle on which wheel assembly 210 rides. Valve assemblies 220 are mounted on inner periphery 215 of outside wheel 210a so as to not interfere with odometer 235. Furthermore, because valve assemblies 220 are preferably located on opposite positions on inner periphery 215 of outside wheel 210a, the dynamic balance of dual-tire wheel assembly 210 is not upset. More importantly, this opposite side area of inner periphery 215 of outside wheel 210a allows a relatively large pressure gauge 205 face to be mounted therein whose display of proper or improper tire inflation is easily seen by the truck operator as the truck operator walks past the rig to thus view if the tires are properly inflated without having to bend down by each gauge and open doors to view the gauges as in certain described prior art systems.

Still referring to FIG. 2a, dual-tire wheel assembly 210 may include one or more pieces or strips of reflective material 240 which are preferably adhesively attached to the outer surface of wheel 210a of dual wheel assembly 210. Reflective material 240 is intended to provide adequate reflectivity to prevent accidents caused by another vehicle hitting the side of the truck or other vehicle on which the mechanical tire pressure indicator system is mounted. Reflective material 240 is preferably composed of cube corner (micro-prism) retro-reflective elements integrally bonded to a flexible, smooth-surfaced, tough, weather-resistant UV stabilized polymeric film. The prism surfaces may be coated with a vacuum deposition of aluminum to impart a mirror surface to the prism facets. Reflective material 240 preferably conforms to ASTM E810 standards to meet or exceed the requirements of ASTM D4956-90 Type V Sheeting. An example of suitable reflective material 240 is the commercially available product DURABRITE.RTM vehicle marking tape sold by Reflexite Corporation of New Haven, Conn.

Figure 2C:
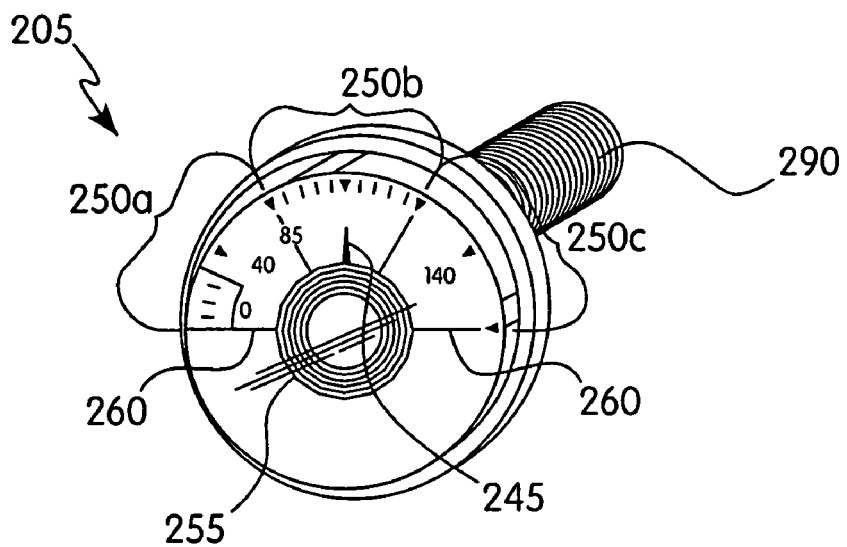
FIG. 2c is a perspective view of a tube type tire gauge used in the mechanical tire pressure indication apparatus shown in FIGS. 2a and 2b.
Figure 2D:
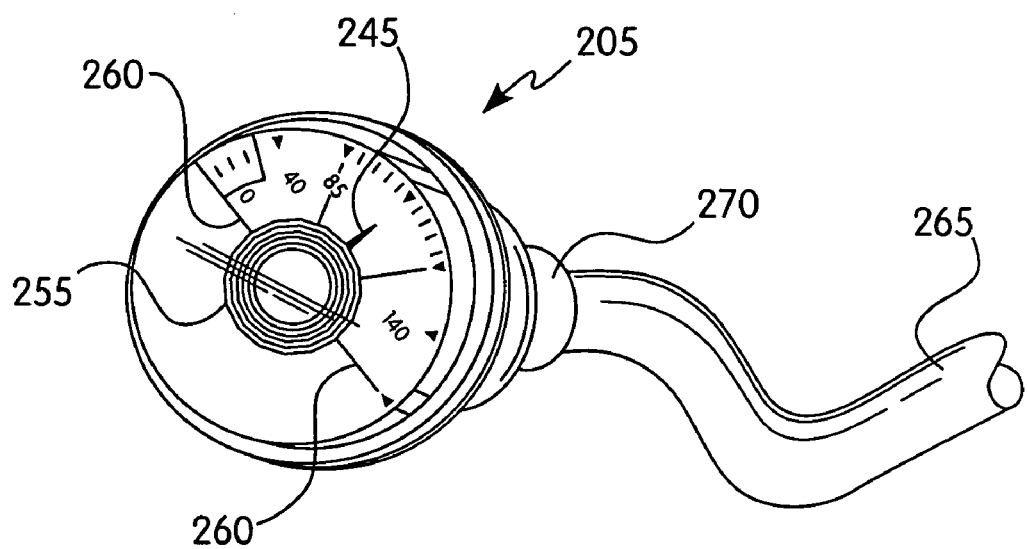
FIG. 2d is a perspective view of a tube type tire gauge similar to that illustrated in FIG. 2c, which is suitable for use in the tire pressure indication apparatus shown in FIGS. 2a and 2b.
Figure 2E:
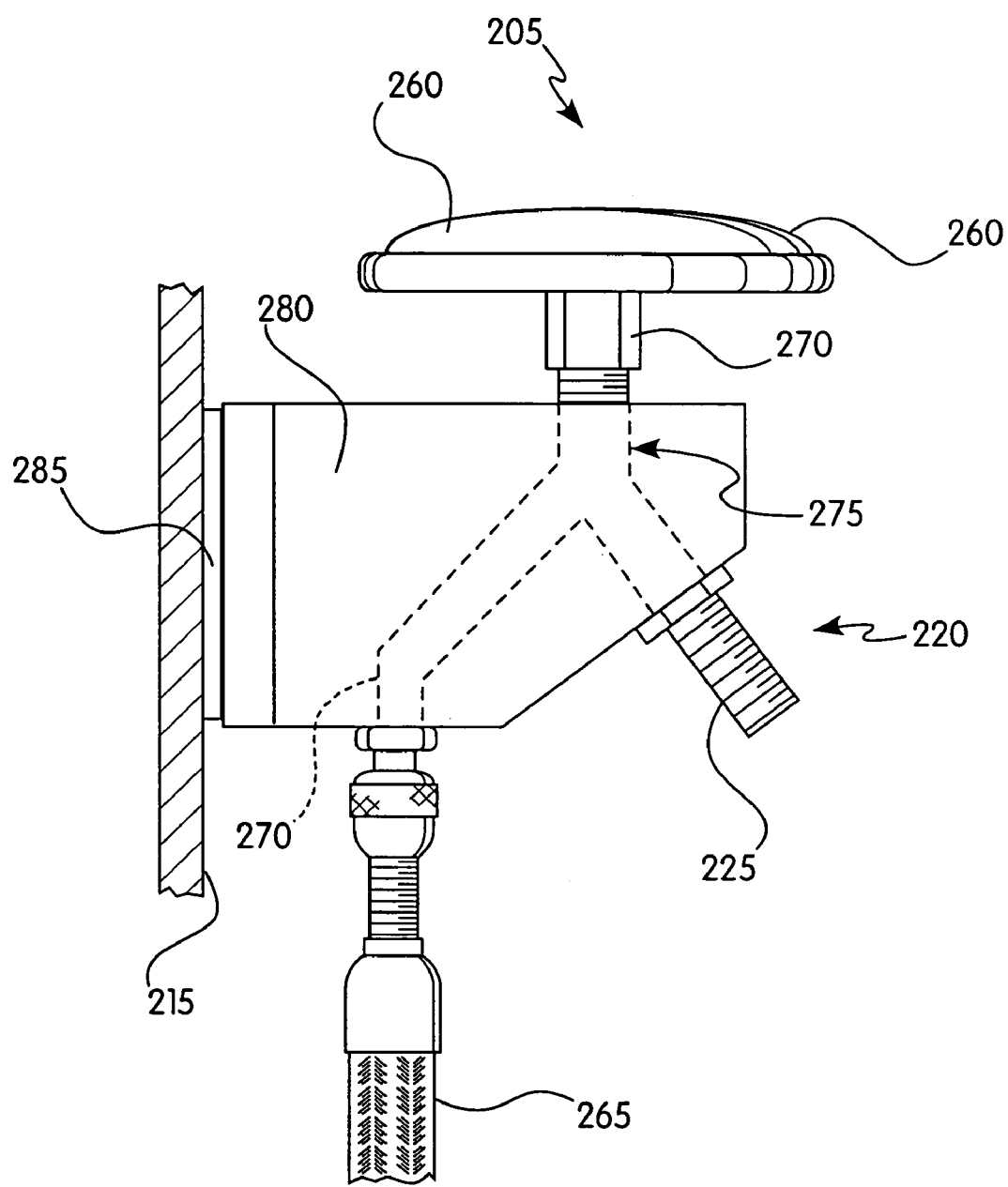
FIG. 2e is an enlarged top view of the gauge illustrated in FIG. 2c mounted to the inner periphery of the outside wheel of the assembly illustrated in FIGS. 2a and 2b using adhesive tape.

With principal reference to FIG. 2c and FIG. 2d, pressure gauge 205 is preferably a Bourdon tube type pressure gauge having an indicating pointer 245 extending from one end of a spiral spring 255. Pressure gauge 205 is preferably calibrated with an analog scale of marked tire pressure having from zero to one hundred and eighty (180) pounds per square inch. The analog scale is preferably divided into three areas, referred to herein as a left area 250a, a central area 250b and a right outer area 250c. The adjacent areas preferably are of contrasting color to provide a binary indication of safe or unsafe tire pressure. Central area 250b is preferably green to indicate proper tire inflation, so that when indicating pointer 245, which is preferably white, is in central area 250b a truck operator walking past dual-tire wheel assembly 210 can easily see indicating pointer 245 against the green background provided by display and determine that the tires are properly inflated. Left area 250a and right area 250c are preferably red so that when indicator 245 is outside an acceptable range and hence is in either of the red left and right areas 250a, 250c, a truck operator can easily see that there is a problem with tire pressure.

These preferably red and green areas thus provide a binary display indicating proper or improper tire inflation to the truck operator without requiring the truck operator to determine the actual pressure. The truck operator can use an air hose to fill or relieve tire pressure through a respective valve stem 225 (shown in FIGS. 2a and 2b) associated with a respective gauge 205, to bring the associated tire to the proper inflation. Under these conditions, the analog scale portion of gauge 205 is used by the truck operator when adjusting pressure in outside tire 210a and/or in inside tire 210b and hence bring indicator 245 back in to the safe, central area 250b.

Gauge 205 is preferably also used to facilitate inflation of outside tire 210a and/or inside tire 210b to an optimal inflation point (e.g. one hundred pounds per square inch) which is indicated on gauge 205 by indicator 245 being in the portion of central area 250b having an associated numeric indication of the optimal inflation point (e.g. "100 psi", etc.). A pair of stop posts 260 are preferably located on gauge 205 near each end of the analog scale and extend perpendicularly to the face of the gauge to prevent indicator 245 from over-extending during high-speed wheel rotation.

Continuing with principal reference to FIGS. 2a, 2b and 2e, gauge 205 has an internally threaded pressure inlet port 270 which threadly receives the leg of a Y-section 275 of valve assembly 220 along the arms of Y-section 275 are internally threaded, having threads complementary to the threads flexible hoses 265. Outside wheel 210a and inside wheel 210b each preferably having a conventional tire fill valve (not shown) extending through the rim form the inside of the respective tire. Each flexible hose 265 connects the respective tire fill-valve with a respective gauge 205, facilitating inflation and/or deflation via an associated valve stem 225.

The flexible hoses 265 attach to individual interiorly threaded pressure inlets 272 formed on the arms of Y-shaped section 275, which sealably screw into inlets 272 at the extremities of the arms of Y-section 275. Hoses 265 are long enough to allow valve assembly 220 to be removed from dual-tire wheel assembly 210 a sufficient distance to enable flexible hoses 265 to be easily disconnected when desired. Valve assembly 220 is preferably connected to the rim or wheel inner periphery at a position radially outward of the respective ones of outside and inside wheel indicators 230a, 230b, and has a one hundred and eighty degree coupling at a distal end of flexible hose 265 for threadly sealably screwing on to conventional tire fill-valves (not shown). Gauges 205 are preferably connected to the conventional rim-attached tire fill-valves or by flexible hoses 265 having such a length that valve assembly 220 may be disconnected and moved outwardly from dual-tire wheel assembly 210 to allow valve assembly 220 to be laid aside to gain full access for disassembly.

For a secure mounting at high speeds or for bumps or potholed roadways, valve assembly 220 is preferably mounted to a bracket 280 secured to inner periphery 215 of outside wheel 210a by using fastening means. The fastening means for securing bracket 280 to inner periphery 215 of outside wheel 210a is preferably a double-coated acrylic foam adhesive tape 285 resident on the rear surface of bracket structure 280. A preferred embodiment of adhesive tape 285 is commercially available as Acrylic Foam Tape 5356 available from 3M Corporation, St. Paul, Minn. Welding or mechanical out-bolt fastener means may also be used.

Mechanical tire pressure indication apparatus 200 facilitates gauging pressure and filling pneumatic tires on cars, trucks, other power vehicles or trailers. While adaptable for most all pneumatic tire carry wheels, wheel single or dual, apparatus 200 is particularly useful with dual deep-dish wheels as commonly used on trucks and tractor-trailer rigs. Dual-tire wheel assemblies are essential two single wheels bolted together back to back. The air-fill, mechanical gauging apparatus in this aspect of the invention provides readily accessible tire fill valve stems for filling or lowering air pressure in respective tires and preferably includes a tire pressure gauge for each tire. An advantage of mechanical tire pressure indication apparatus 200 is that the apparatus can be easily mounted to inner periphery 215 of outside wheel 210a without necessarily having to mount to a hubcap or similar structure on the wheel exteriorly facing side.

With principal reference to FIG. 3a through FIG. 3d, a preferred embodiment of wheel clip assembly is designated generally 300. Wheel clip assembly 300 can be used independently or in conjunction with tire pressure indication system 300. Furthermore, while wheel clip assembly 300 is primarily discussed in the context of a more traditional wheel cover, embodiments of wheel clip assembly can also be used in conjunction with aerodynamic wheel cover 400, which is described in further detail below in conjunction with FIG. 4a through 4f.

Continuing with principal reference to FIG. 3a through 3d, wheel clip assembly 300 comprises first affixing means, such as a bracket portion 305, to a wheel cover 310, and second affixing means, such as base portion 325 to inner periphery 215 of outside wheel 230a. Bracket portion 305 preferably includes a first end 315 and a second end 320. Base portion 325 preferably comprises a planar strip that is curved to conform to the inner periphery 215 of outside wheel 230a.

Bracket portion 305 and base portion 325 are preferably of a rigid one piece-construction, such as for example, a single stainless steel structure or other suitable plastic material, metal, etc. However, bracket portion 305 may be manufactured from a first rigid material, such as, metal, and base portion 325 is manufactured from a second rigid material, such as, for example, plastic. If bracket portion 305 and base portion 325 are manufactured from two different materials, first end 315 of bracket portion 305 is preferably coupled to base portion 325 using adhesive, welding, bolting, or any other suitable fastening technique.

Second end 320 of bracket portion 305 provides clip fastening means, such as a spring clip 330 and a fastening stud 335 that facilitates attachment of wheel clip assembly 300 to the wheel cover 310. Although illustrated in FIG. 3c and FIG. 3d as a flat disc, wheel cover 310 may comprise aerodynamic wheel cover 400, discussed below with principal reference to FIG. 4a through FIG. 4f.

Second end 320 of bracket portion 305 can be permanently affixed to wheel cover 310 (or to aerodynamic wheel cover 400). Preferred embodiments comprise protrusions 340 that extend from second end 320 in opposing relationship about a passage 345 that provides clearance for the fastening stud 335 for engagement about the spring clip 330. The fastening stud 335 is inserted through passage 345, twisted about passage 345, and locked about spring clip 330.

Figure 3A:
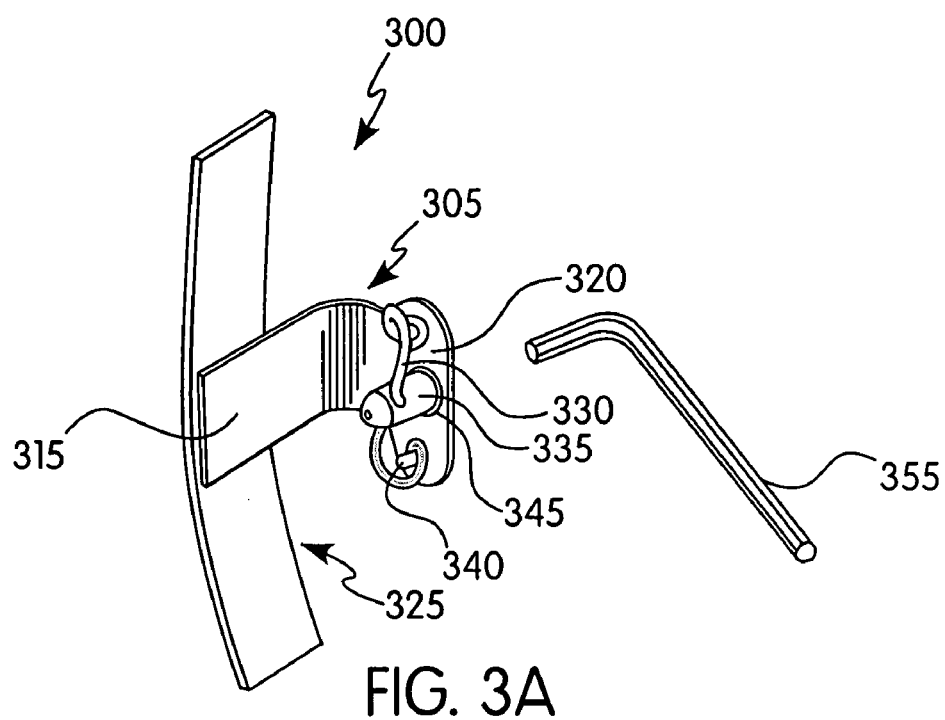
FIG. 3a is a perspective view of a wheel clip assembly.
Figure 3B:
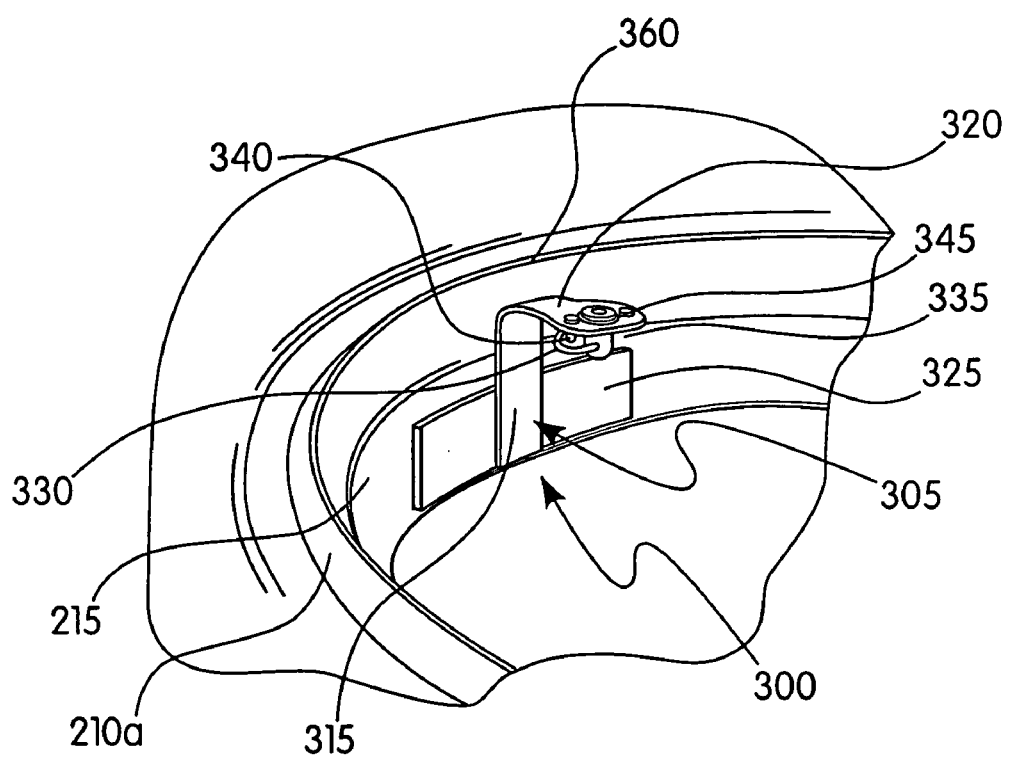
FIG. 3b is a perspective view of the wheel clip assembly of FIG. 3a affixed to an inner periphery of a wheel.
Figure 3C:
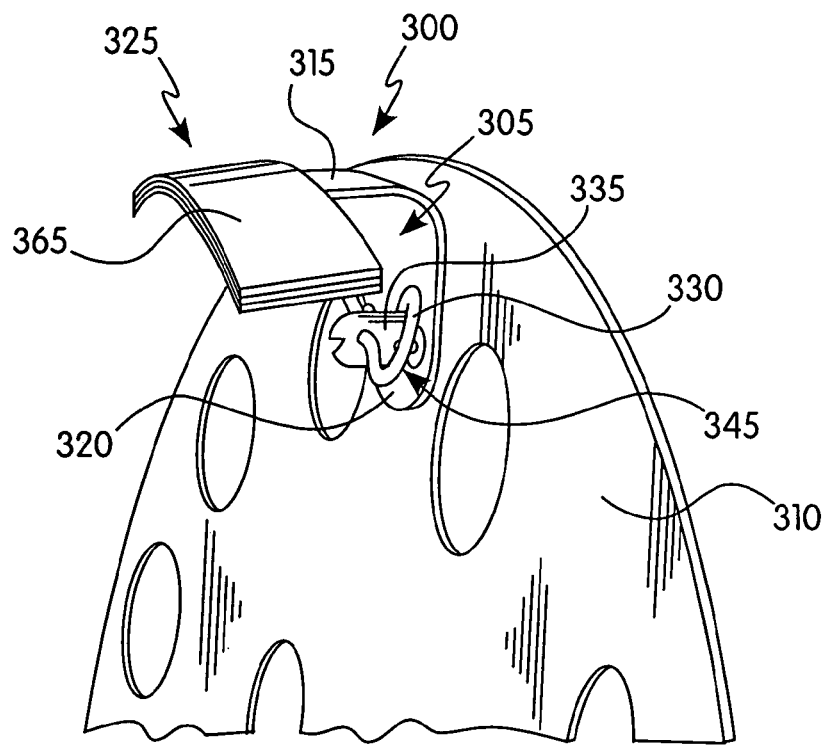
FIG. 3c is a perspective view of the wheel clip assembly of FIG. 3a affixed to the interior of a wheel cover.
Figure 3D:
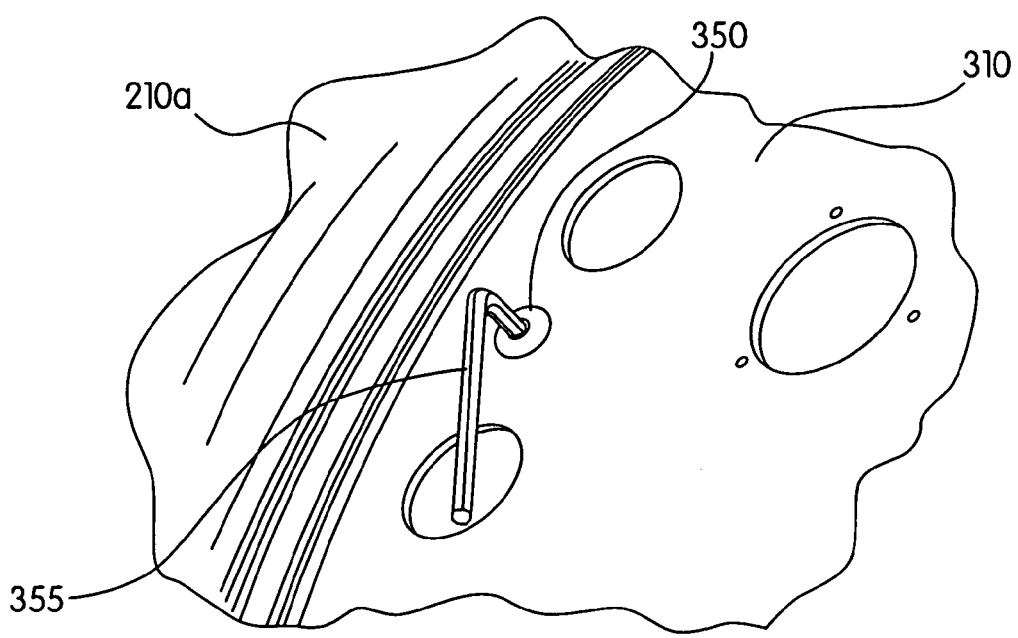
FIG. 3d is a perspective view of the exterior of the wheel cover of FIG. 3c affixed to the fastener of the wheel clip assembly shown in FIGS. 3a through 3c.

As shown in FIG. 3d, fastening stud 335, preferably comprising a Dzus fastener, may then be twisted at a key portion 350 with the use of an Allen wrench 355 so that fastening stud 335 may be locked on spring clip 330. Spring clip 330 draws fastening stud 335 away from second end 320 of bracket portion 305 when Allen wrench 355 is turned, creating pressure where the diameter of key portion 350 meets wheel cover 310.

Continuing with principal reference to FIGS. 3a through 3d, wheel clip assembly 300 is preferably located at inner periphery 215 of an outer wheel 210a (or an inner wheel 210b). This provides circumferential support to wheel clip assembly 300. Base portion 325 of wheel clip assembly 300 is preferably positioned within inner periphery 215 of outer wheel 210a so that second end 320 of base portion 325 is on the same plane of an outer circumference 360 of the given wheel. As principally shown in FIG. 3b, wheel clip assembly 300 preferably adheres to inner periphery 215 by use of the adhesive 365 about an outer side of base portion 325.

Adhesive 365 is preferably doubled-sided tape, glue, or any substance suitable for withstanding the intense heat generated by tire and braking systems. Adhesive 365 is preferably selected to have properties that will increases adhesiveness over time when intense heat is exhibited on the wheel rim. As the vehicle is moving, centrifugal forces acting on wheel clip assembly 300 also increase the adhesiveness of the adhesive 365, which supplements the integrity of the circumferential support of wheel clip assembly 300 to the wheel rim. Wheel clip assembly 300 may be secured to inner periphery 365 of outer wheel 210a (or inner wheel 210b) by welding, bolting or other suitable method.

Wheel clip assembly 300 is desirably fastened to the interior of a wheel cover 310 (or an aerodynamic wheel cover 400). As principally shown in FIGS. 3c and 3d, second end 320 of the bracket portion 305 provides fastening means to wheel cover 310 by extending fastening stud 335 through passage 345. Preferred embodiments of fastening stud 335 comprise a Dzus fastener and have a key portion 350 with a larger diameter than the corresponding opening in wheel cover 310 so that proper attachment of wheel cover 310 to clip assembly 300 may be executed. In cases where aerodynamic wheel cover 400 is used, the larger diameter of key portion 350 provides sufficient sealing of the opening in passage 345 such that a low pressure may be maintained in aerodynamic wheel cover 400 such that it may maintain a vacuum to expedite warm air out from the wheel rim through the single narrow passage about its apex.

Once the fastening stud 335 is received at second end 320 and is positioned about spring clip 330, Allen wrench 355 is inserted into key portion 350 and is twisted so that proper locking of wheel cover 310 to wheel clip assembly 300 occurs. Sufficient pressure exerted by fastening stud 335 draws wheel cover 310 adjacent to second end 320 of bracket portion 305.

Wheel clip assembly 300 provides an intermediate, lateral attachment to wheel cover 310 (or aerodynamic wheel cover 400) to the wheel rim. Nonlimiting examples of possible vehicle applications of wheel clip assembly 300 include Class 8 tractors, Class 8 trailers, Class 7/6 tractors, Class 5/4/3 trucks, Class 2C trucks, school buses, Greyhound-type buses, etc.

With principal reference to FIG. 4a through FIG. 4f, a preferred embodiment of aerodynamic wheel cover 400 will now be discussed. FIG. 4a shows an outer wheel 210a having a preferred embodiment of an aerodynamic wheel cover 400 comprising a bridge section 405, as well as a pressure sensor arrangement 410 disposed over an exhaust port 415. Aerodynamic wheel cover 400 preferably also comprises a plurality of reflectors 420 exteriorly located. Aerodynamic wheel cover 400 is preferably fastened to a wheel rim 425 of outer wheel 210a (or some other wheel) by aerodynamic wheel cover fastening means 300a, which preferably comprises an embodiment of wheel clip 300 being properly modified for use with aerodynamic wheel cover 400 (e.g. increasing the angle between bracket portion 305 and base portion 325). As shown I FIG. 4b, aerodynamic wheel cover fastening means 300a preferably extends from wheel rim 425 at one end and is located about the circumference of aerodynamic wheel cover 400 at an opposing end.

It is contemplated that other aerodynamic wheel cover fastening means 300a may include adhesive tape between aerodynamic wheel cover 400 and wheel rim 425. Other contemplated wheel cover fastening means 300a include affixing a plurality of nuts to the interior of aerodynamic wheel cover 400 through exhaust port 415. Wheel clip assembly 300 may also be welded, bolted or adhered to aerodynamic wheel cover 400 with another suitable manufacturing technique. Any suitable means for fastening can be utilized.

Continuing with principal reference to FIG. 4a through FIG. 4f, the elliptically-shaped dome of aerodynamic wheel cover 400, which is similar in design to the contour of aircraft wings, improves the aerodynamics and reduces the drag and operating temperatures of outer wheel 210a. Airflow drag, which is typically exhibited on a plurality of nut and bolt assemblies 430 that extend from wheel rim 425, is diverted from nut and bolt assemblies 430 and the surface of wheel rim 425 to the exterior surface of aerodynamic wheel cover 400. The dimensions of the elliptically-shaped dome of aerodynamic wheel cover 400 are preferably defined by cover diameter D1 and a depth D extending from the exterior of aerodynamic wheel cover 400 to the exterior surface of wheel rim 425. The dimensions of aerodynamic wheel cover 400 are preferably also defined by a port diameter D2 at exhaust port 415 is located at or proximate to the apex of aerodynamic wheel cover 400 in order to desirably maintain low pressure within aerodynamic wheel cover 400.

According to preferred embodiments of aerodynamic wheel cover 400, cover diameter D1 and depth D are approximately 22.5 inches and 6 inches respectively and port diameter D2 is approximately 9 inches. Dimensions can vary and are related to the dimensions of wheel rim 425, outer wheel 210a (or other wheel), etc. These sample dimensions may apply to a heavy-duty trucking application, such as an eighteen-wheeler trucking application, for example. However, it is intended that the sample dimensions are nonlimiting. The dimensions would be proportionately smaller for embodiments of the invention directed towards smaller, regular trucking applications, for example.

With principal reference to FIG. 4c and FIG. 4d, pressure sensor arrangement 410 is shown to comprise bridge section 405 and valve arrangement 435. Bridge section 405 provides mounting means for valve arrangement 435 and gauge 205, which senses and provides a display of the tire pressure level. Pressure sensor arrangement 410 may include pressure gauge 205 or other gauge (e.g. a digital gauge) that may tap off of a conventional rim-attached tire fill-valves 465 extending from wheel rim 425 via valve arrangement 435 and hose 450. Such interconnectivity is designed to provide tire pressure sensing and indication while outer wheel 210*a* is in motion or at rest. In some embodiments, pressure sensor arrangement 410 is directly attached to conventional rim-attached tire fill-valve 465.

Valve arrangement 435 preferably comprises an intake valve 440 for inflating outer wheel 210*a* (or other wheel). Because the valve arrangement 435 rests on bridge section 405 and is slightly recessed within exhaust port 415, drag on aerodynamic wheel cover 400 about pressure sensor arrangement 410 may also be reduced. Bridge section 405 is preferably welded, bolted, or otherwise fastened to the interior of aerodynamic wheel cover 400 with any suitable means.

With principal reference to FIG. 4*e*, it is shown that port diameter D2 assists in reducing the operating temperatures of outer wheel 210*a* (or other wheel). As shown, the operating temperature is reduced through Bernoulli's theorem when streamlines, designated generally as V, pass from the openings in wheel rim 435 and out through exhaust port 415 of aerodynamic wheel cover 400.

In some circumstances, such as if the velocity of air is less than 300 km/hour and if there are an absence of pressure differences greater than one tenth of an atmosphere, the air may be considered to be incompressible because its density may remain fairly constant. According to the present invention, streamlines V are not flowing at great lengths on the order of hundreds of meters and considering gravity in the current application is thus inconsequential because outer wheel 210*a* is treated at the same altitude as ground. Therefore, because streamlines V behave as an incompressible fluid and gravity does not have to be considered, Bernoulli's theorem predicts that the sum of the air's pressure potential and kinetic energy should be constant across any given streamline V. Thus, if streamlines V accelerate, air pressure must drop and if streamlines V accelerate, air pressure must rise.

The curvature of aerodynamic wheel cover 400 thus creates a low-pressure chamber 455 about wheel rim 425 and the inner periphery of aerodynamic wheel cover 400. Low-pressure chamber 455 causes warm air at atmospheric pressure (e.g. 14.7 ponds per square inch), which may be generated from the engine or braking system or other vehicle components, to accelerate toward exhaust port 415 as shown by streamlines V in FIG. 4*e*.

Narrow diameter D2 of exhaust port 415 causes streamlines V of warm air to bunch tightly together, which indicates a dramatic rise in speed and severe drop in air pressure. For example, as shown in FIG. 4*f* a drop in air pressure occurs when the atmospheric pressure near wheel rim 425 drops from 14.7 pounds per square inch to approximately 2.5 pounds per square inch as streamlines V travel depth D (shown in FIG. 4*b*) toward exhaust port 415. As shown, exhaust port 415 acts as a vacuum and permits warm air to evacuate from outer wheel 210*a* (or other wheel). While streamlines V of the air leaving aerodynamic wheel cover 400 may be slightly below atmospheric pressure (e.g. the pressure may be approximately 11.4 pounds per square inch), streamlines V travel fast enough such that most of their total energy is kinetic energy. Streamlines V spread out as streamlines V flow out of exhaust port 425. This spreading indicates that streamlines V are slowing down and exchanging kinetic energy for potential energy in the form of increasing pressure. Shown in FIG. 4*f*, once streamlines V are clear of aerodynamic wheel cover 400, streamlines V exit to the outer environment and the pressure of the air rises to atmospheric pressure (e.g. 14.7 pounds per square inch).

As shown above, traditionally, the dramatic increase in speed and drop in air pressure occurs for a steady state flow of fluid that passes through a narrow channel, which is called the Venturi effect. The Venturi effect is a special case of Bernoulli's principle, which recognizes that any increase in fluid velocity along a streamline is accompanied by a drop in pressure. Thus, higher temperatures about wheel rim 425 may be continuously and quickly evacuated from outer wheel 210*a* (and any other wheel having aerodynamic wheel cover 400). By reducing operating temperature in this manner, a consistent operating temperature and tire pressure may occur during vehicle operation so as to cool the braking system and enable consistent tire pressures. Accordingly, aerodynamic wheel cover 400 offers a plurality of desirable features that enhances the operability of heavy-duty roadway vehicles, such as tractors, trailers, and trucks.

In one implementation of the electrical aspects of the invention disclosed in FIGS. 1, 5, 6 and 7 with discrete components and integrated circuits the invention provides multiple uses for commercial and non-commercial applications. In this implementation, differential air pressure is used as an input stimulus to an electrical air pressure device which in turn converts the air pressure into a corresponding electrical voltage that can be used for the electrical circuit involved. The sensor is then connected to a voltage comparator to differentiate the change in voltage to activate a relay in turn completing the connection of a transmitter of desired frequency. The desired frequency is transmitted to a receiver display panel announcing a drop in air pressure by a light emitting diode or an audible tone for each process controlled parameter. Both sending and receiving units are fully adjustable within the elected bounds of air pressure, voltage output rate, change of air pressure and frequency.

In this implementation of the invention, the invention may be updated by programmable satellite capability using a directional antenna and one or two chips in the design. Each sending unit may be in capsulated and have its own replaceable power source. The receiver may be designed with different color light emitting diodes and different audible alarms in accordance with a particular customer's demands.

The invention is adaptable for use wherever gas pressure monitoring applications are needed. The transmitter or sending unit, when energized by its power source and having a gas pressure applied to the sensor, the apparatus preset parameters respond when the pressure drops below a predetermined reference voltage. The resulting electrical signal triggers a relay or a micro-controller recluses circuit activating the sending unit or transmitter to send a signal to the receiver and produce a output on a receiver display panel. It is further within the contemplation of the invention to provide in the signal output a complete Department of Transportation specification band with as per United States Department of Transportation standards.

Although there has been hereinabove described a pressure system and apparatus, in accordance with the present invention, for the purposes of illustrating the manner in which the invention may be used to advantage, it should be appreciated that the invention is not limited thereto. Accordingly, any and all modifications, variations, or equivalent arrangements which may occur to one skilled in the art should be considered to be within the scope of the present invention as defined in the appended claims.

What is claimed is:

1. A multi-wheeled highway vehicle for transporting passengers, cargo or both, comprising:
   a. plurality of wheels supporting said vehicle, said wheels having pneumatic tires mounted thereon;
   b. a transducer mounted on one of said wheels at a position radially inboard of the tire mounted on the wheel, for sensing pressure in the tire mounted on the wheel and providing an output signal indicative thereof;
   c. a comparator connected to said wheel at a position radially inboard of the tire-wheel interface, receiving said output signal, for comparing said output signal from said transducer to a reference and providing an second output signal indicative of said comparison;
   d. a transmitter carried by said vehicle, receiving said second output signal produced by said comparator, for sending tire pressure information in said second output signal to a remote locale, optionally together with information identifying said vehicle, and/or the location of said vehicle and/or the speed and/or direction of travel thereof;
   e. an aerodynamic wheel cover assembly attached to the inner periphery of said wheel having said transducer connected thereto, said wheel cover assembly comprising:
      i. a substantially elliptically-shaped dome sized to be securely attached to the wheel with the rim facing into a concave side of said dome;
      ii. an exhaust port positioned at an apex of the dome, having diameter creating low pressure within the wheel cover when the wheel cover is fastened to said wheel and said wheel is rotating;
      iii. a bridge over the exhaust port;
      iv. a mechanical pressure gauge, an intake valve, a valve stem, a valve assembly and a gauge, at least one of which being disposed on said bridge and remaining ones being proximate said bridge, wherein the valve stem, hose, gauge and valve assembly are in pneumatic communication such that when the hose is in pneumatic communication with a fill-valve of the tire, the gauge displays pressure of the tire and the tire can be inflated and deflated via the valve stem;
      v. a wheel clip assembly base portion comprising a strip curved to conform to an inner periphery of the rim;
      vi. a wheel clip assembly bracket portion attached to the base portion and having a first and second end;
      vii. a spring clip secured to the second end; and
      viii. a Dzus fastener positioned about the spring clip and securing the aerodynamic wheel cover against the bracket portion.

2. Apparatus for monitoring tire pressure in a tire of multi-wheeled highway vehicle for transporting passengers, cargo or both, comprising:
   f. a transducer mechanically mounted on one wheel of the vehicle at a position radially inboard of the tire mounted on the wheel, for sensing pressure in the tire mounted on the wheel and providing an output signal indicative thereof;
   g. a comparator mechanically mounted on the exteriorly facing surface of the wheel radially inboard of the tire mounted thereon, receiving said output signal, for comparing said output signal from said transducer to a reference and providing an second output signal indicative of said comparison;
   h. a transmitter carried by and mounted on an exteriorly facing surface of the vehicle wheel and inboard of the tire, receiving said second output signal produced by said comparator, for sending tire pressure information in said second output signal to a remote locale, optionally together with information identifying the vehicle, and/or the location of the vehicle and/or the speed and/or direction of travel thereof;
   i. an externally facing aerodynamic wheel cover assembly attached to the radially outboard periphery of the wheel having the transducer connected thereto, for shielding the transducer, the comparator and the transmitter from windage during vehicle operation, comprising:
      ix. a dome sized to be securely attached to a rim of the wheel having the transducer, comparator and transmitter associated therewith, the exteriorly facing surface of the wheel facing a concave side of said dome.

3. Apparatus of claim 2 wherein the dome further includes an exhaust port, having diameter creating low pressure within the wheel cover when the wheel cover is fastened to the wheel and the wheel is rotating, and wherein the apparatus further comprises:
   a. a bridge over the exhaust port;
   b. a mechanical pressure gauge, an intake valve, a valve stem, a valve assembly and a gauge, at least one of which being disposed on said bridge and remaining ones being proximate said bridge, wherein the valve stem, hose, gauge and valve assembly are in pneumatic communication such that when the hose is in pneumatic communication with a fill-valve of the tire, the gauge displays pressure of the tire and the tire can be inflated and deflated via the valve stem;
   c. a wheel clip assembly base portion comprising a strip curved to conform to an inner periphery of the rim;
   d. a wheel clip assembly bracket portion attached to the base portion and having a first and second end;
   e. a spring clip secured to the second end; and
   f. a Dzus fastener positioned about the spring clip and securing the aerodynamic wheel cover against the bracket portion.

* * * * *